(12) United States Patent
Gaikwad et al.

(10) Patent No.: US 7,583,758 B2
(45) Date of Patent: Sep. 1, 2009

(54) CARRIER DETECTION APPLICABLE FOR SISO, MIMO, MISO, AND SIMO COMMUNICATIONS

(75) Inventors: Rohit V. Gaikwad, San Diego, CA (US); Rajendra Tushar Moorti, Mountain View, CA (US); Jason A. Trachewsky, Menlo Park, CA (US)

(73) Assignee: Broadcom Corporation, Irvine, CA (US)

( * ) Notice: Subject to any disclaimer, the term of this patent is extended or adjusted under 35 U.S.C. 154(b) by 568 days.

(21) Appl. No.: 11/402,571

(22) Filed: Apr. 12, 2006

(65) Prior Publication Data

US 2007/0019749 A1    Jan. 25, 2007

Related U.S. Application Data

(60) Provisional application No. 60/700,968, filed on Jul. 20, 2005.

(51) Int. Cl.
*H04L 27/00* (2006.01)
*H04L 27/06* (2006.01)

(52) U.S. Cl. ........................... 375/326; 375/343
(58) Field of Classification Search ............... 375/260, 375/326, 327, 343, 344, 267, 316, 323, 325, 375/347, 349; 370/208, 329; 455/525; 329/306–309
See application file for complete search history.

(56) References Cited

U.S. PATENT DOCUMENTS

| | | | |
|---|---|---|---|
| 5,883,920 A * | 3/1999 | Maruyama et al. .......... 375/130 |
| 7,024,191 B2 * | 4/2006 | Ofuji et al. ................ 455/432.1 |
| 2001/0055287 A1 * | 12/2001 | Sawada et al. .............. 370/329 |
| 2004/0042534 A1 * | 3/2004 | Raphaeli et al. ............. 375/150 |
| 2004/0218695 A1 * | 11/2004 | Koga et al. .................. 375/326 |
| 2005/0075125 A1 * | 4/2005 | Bada et al. .................. 455/525 |
| 2005/0220230 A1 * | 10/2005 | Fukuda ....................... 375/343 |
| 2007/0019750 A1 * | 1/2007 | Gaikwad et al. ............. 375/260 |

* cited by examiner

*Primary Examiner*—Tesfaldet Bocure
*Assistant Examiner*—Lawrence B Williams
(74) *Attorney, Agent, or Firm*—Garlick Harrison & Markison; Shayne X. Short

(57) ABSTRACT

Carrier detection applicable for SISO, MIMO, MISO, and SIMO communications. A novel approach is presented to perform carrier detection for a signal found in any of a wide variety of communication systems including single-input-multiple-output (SISO), multiple-input-multiple-output (MIMO), multiple-input-single-output (MISO) single-input-multiple-output (SISO), communication systems. This novel approach to performing carrier detection is more robust than those approaches existent in the art. By employing normalization with respect to power in determining a modified correlation function, there is less susceptibility to false detects. Also, this approach is quite robust to any circuitry DC offsets that may undesirably exist within a communication device that undergoes operational changes due to a variety of factors including environmental perturbations and/or changes in processing circuitry within the communication device (e.g., changes in gain control).

26 Claims, 13 Drawing Sheets

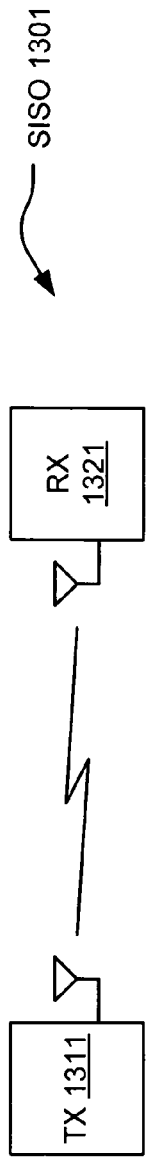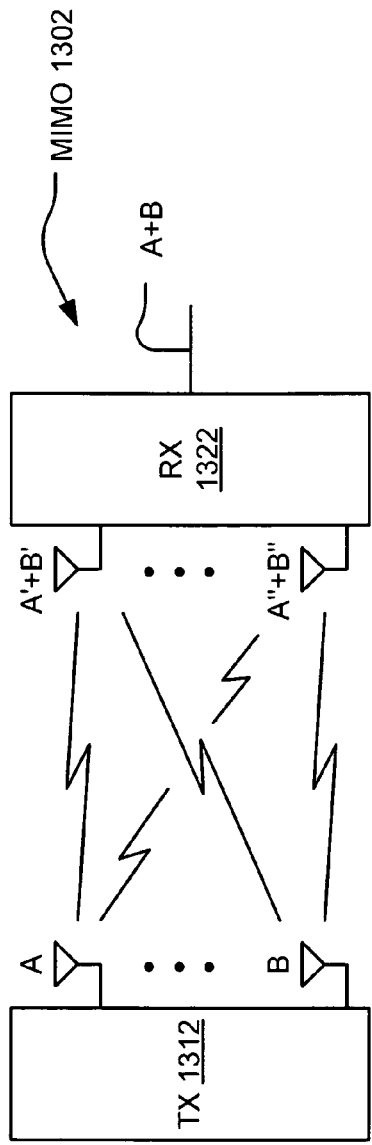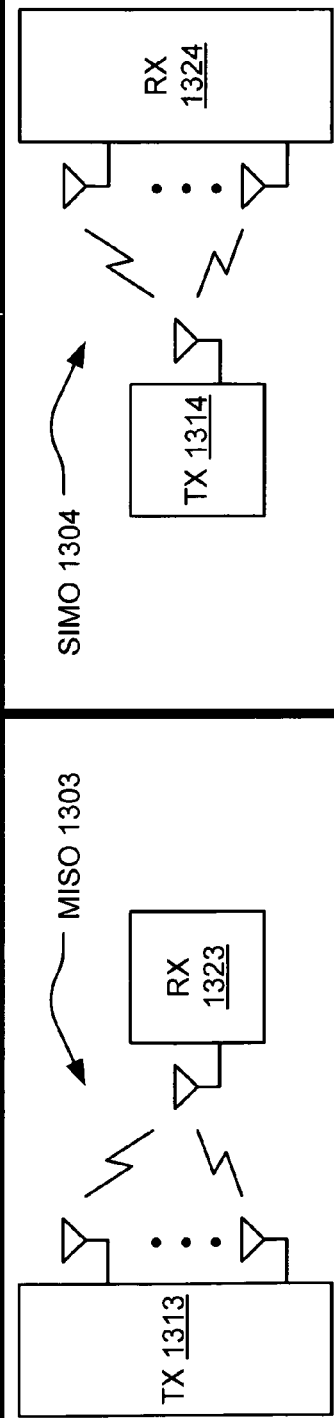
Fig. 13A
Fig. 13B
Fig. 13C
Fig. 13D

_

CARRIER DETECTION APPLICABLE FOR SISO, MIMO, MISO, AND SIMO COMMUNICATIONS

CROSS REFERENCE TO RELATED PATENTS/PATENT APPLICATIONS

Provisional Priority Claims

The present U.S. Utility Patent Application claims priority pursuant to 35 U.S.C. § 119(e) to the following U.S. Provisional Patent Application which is hereby incorporated herein by reference in its entirety and made part of the present U.S. Utility Patent Application for all purposes:

1. U.S. Provisional Application Ser. No. 60/700,968, entitled "Carrier detection applicable for SISO, MIMO, MISO, and SIMO communications," filed Wednesday, Jul. 20, 2005, pending.

Incorporation by Reference

The following U.S. Utility Patent Applications are hereby incorporated herein by reference in their entirety and made part of the present U.S. Utility Patent Application for all purposes:

1. U.S. Utility patent application Ser. No. 11/132,939, entitled "Carrier detection for multiple receiver systems," filed May 19, 2005, pending.

2. U.S. Utility patent application Ser. No. 11/168,793, entitled "Reduced feedback for beamforming in a wireless communication," filed Jun. 28, 2005, pending.

BACKGROUND OF THE INVENTION

1. Technical Field of the Invention

The invention relates generally to communication systems; and, more particularly, it relates to performing carrier detection within such communication systems.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to the antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

In many systems, the transmitter will include one antenna for transmitting the RF signals, which are received by a single antenna, or multiple antennas, of a receiver. When the receiver includes two or more antennas, the receiver will select one of them to receive the incoming RF signals. In this instance, the wireless communication between the transmitter and receiver is a single-output-single-input (SISO) communication, even if the receiver includes multiple antennas that are used as diversity antennas (i.e., selecting one of them to receive the incoming RF signals). For SISO wireless communications, a transceiver includes one transmitter and one receiver. Currently, most wireless local area networks (WLAN) that are IEEE 802.11, 802.11a, 802.11b, or 802.11g employ SISO wireless communications.

Other types of wireless communications include single-input-multiple-output (SIMO), multiple-input-single-output (MISO), and multiple-input-multiple-output (MIMO). In a SIMO wireless communication, a single transmitter processes data into radio frequency signals that are transmitted to a receiver. The receiver includes two or more antennas and two or more receiver paths. Each of the antennas receives the RF signals and provides them to a corresponding receiver path (e.g., LNA, down conversion module, filters, and ADCs). Each of the receiver paths processes the received RF signals to produce digital signals, which are combined and then processed to recapture the transmitted data.

For a multiple-input-single-output (MISO) wireless communication, the transmitter includes two or more transmission paths (e.g., digital to analog converter, filters, up-conversion module, and a power amplifier) that each converts a corresponding portion of baseband signals into RF signals, which are transmitted via corresponding antennas to a receiver. The receiver includes a single receiver path that receives the multiple RF signals from the transmitter. In this instance, the receiver uses beam forming to combine the multiple RF signals into one signal for processing.

For a multiple-input-multiple-output (MIMO) wireless communication, the transmitter and receiver each include multiple paths. In such a communication, the transmitter parallel processes data using a spatial and time encoding function to produce two or more streams of data. The transmitter includes multiple transmission paths to convert each stream of data into multiple RF signals. The receiver receives the multiple RF signals via multiple receiver paths that recapture the streams of data utilizing a spatial and time decoding function. The recaptured streams of data are combined and subsequently processed to recover the original data.

Within these types of communication systems, as well as within other types of communication systems, there is oftentimes a need to perform detect of a carrier within a signal received from a communication channel. In detection theory, there is a generally understood relationship between designing a carrier detection apparatus that tries on one hand to reduce false detections of the carrier and on the other hand to maximize the probability of true carrier detections. Also, within many communication devices implemented within modern communication systems, the circuitry and components therein oftentimes undergo modification (sometimes in real time) and adjustment that can generate certain degrees of transients, static DC offsets, and/or transient DC offsets within certain portions of the communication device. For example, in an AFE (Analog Front End) of a communication device that performs certain functions as filtering, frequency conversion, and/or gain control, the modification and adjustment of many of the components required to perform these functions may undesirably generate many of these deleterious effects. Moreover, sometimes a signal received from a communication channel arrives at a communication device with some degree of a DC offset; this is a deficiency in the actual signal received by the communication device and not a deficiency in the actual components of the corn device itself.

These and other problems that can arise make the challenge of performing carrier detection even more difficult. There seems always to be this balancing between reducing false detections and maximizing the probability of true detections when designing devices operable to perform carrier detection. There seems also continually to be new considerations and trade-offs made available for designers to perform this balancing act in designing means to perform carrier detection. As such, a need continues to exist in the art for better and more effective means by which carrier detection may be performed.

BRIEF SUMMARY OF THE INVENTION

The present invention is directed to apparatus and methods of operation that are further described in the following Brief Description of the Several Views of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWINGS

FIG. 13A is a diagram illustrating an embodiment of a single-input-single-output (SISO) communication system.
FIG. 13B is a diagram illustrating an embodiment of a multiple-input-multiple-output (MIMO) communication system.
FIG. 13C is a diagram illustrating an embodiment of a multiple-input-single-output (MISO) communication system.
FIG. 13D is a diagram illustrating an embodiment of a single-input- multiple-output (SIMO) communication system.

DETAILED DESCRIPTION OF THE INVENTION

Figure 1:
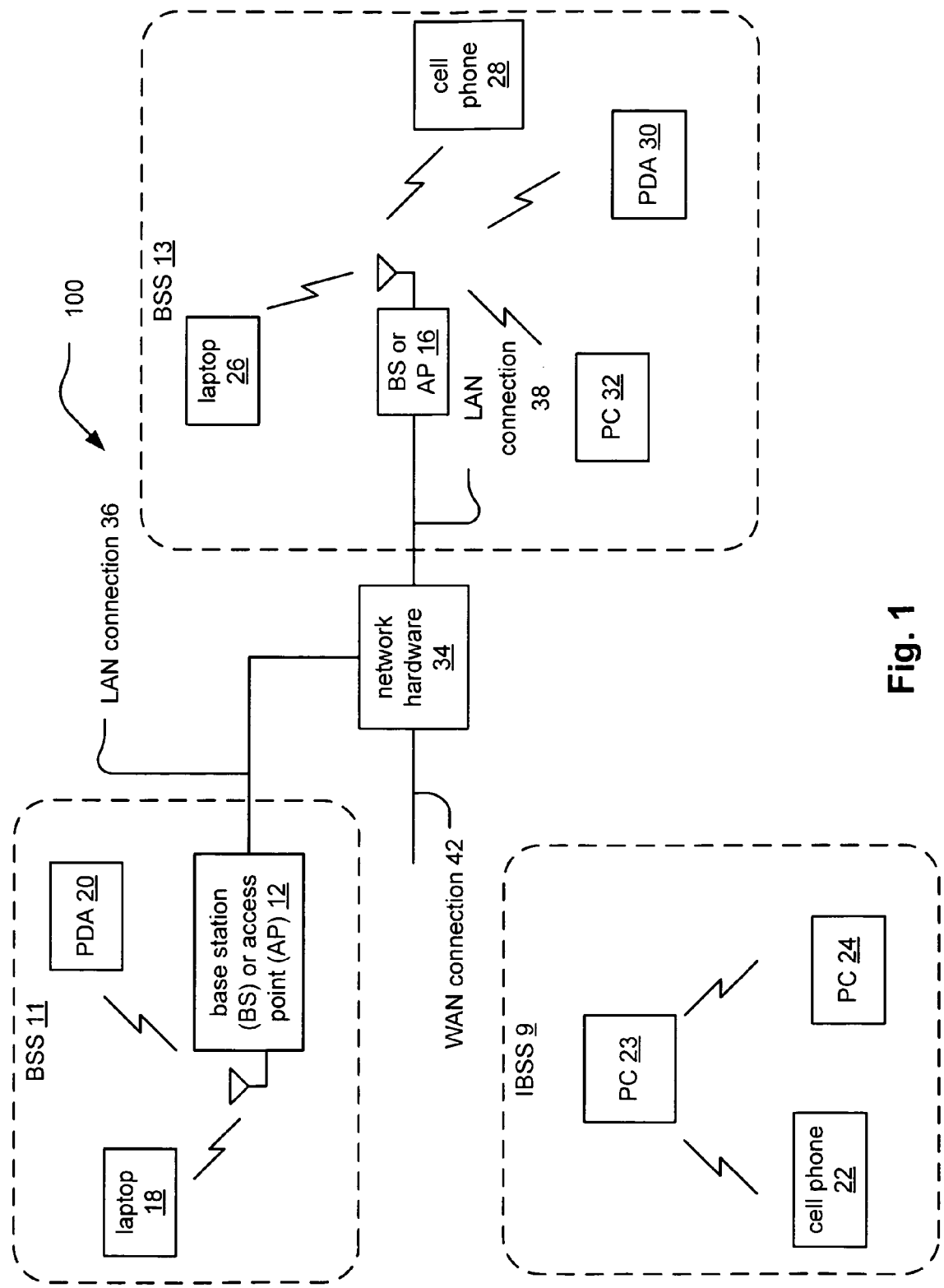
FIG. 1 is a diagram of a wireless communication system.

FIG. 1 is a diagram illustrating a communication system 10 that includes a plurality of base stations and/or access points 12, 16, a plurality of wireless communication devices 18-32 and a network hardware component 34. Note that the network hardware 34, which may be a router, switch, bridge, modem, system controller, et cetera provides a wide area network connection 42 for the communication system 10. Further note that the wireless communication devices 18-32 may be laptop host computers 18 and 26, personal digital assistant hosts 20 and 30, personal computer hosts 24 and 32 and/or cellular telephone hosts 22 and 28. The details of the wireless communication devices will be described in greater detail with reference to FIG. 2.

Wireless communication devices 22, 23, and 24 are located within an independent basic service set (IBSS) area and communicate directly (i.e., point to point). In this configuration, these devices 22, 23, and 24 may only communicate with each other. To communicate with other wireless communication devices within the system 10 or to communicate outside of the system 10, the devices 22, 23, and/or 24 need to affiliate with one of the base stations or access points 12 or 16.

The base stations or access points 12, 16 are located within basic service set (BSS) areas 11 and 13, respectively, and are operably coupled to the network hardware 34 via local area network connections 36, 38. Such a connection provides the base station or access point 12 16 with connectivity to other devices within the system 10 and provides connectivity to other networks via the WAN connection 42. To communicate with the wireless communication devices within its BSS 11 or 13, each of the base stations or access points 12-16 has an associated antenna or antenna array. For instance, base station or access point 12 wirelessly communicates with wireless communication devices 18 and 20 while base station or access point 16 wirelessly communicates with wireless communication devices 26-32. Typically, the wireless communication devices register with a particular base station or access point 12, 16 to receive services from the communication system 10.

Typically, base stations are used for cellular telephone systems and like-type systems, while access points are used for in-home or in-building wireless networks (e.g., IEEE 802.11 and versions thereof, Bluetooth, and/or any other type of radio frequency based network protocol). Regardless of the particular type of communication system, each wireless communication device includes a built-in radio and/or is coupled to a radio.

Figure 2:
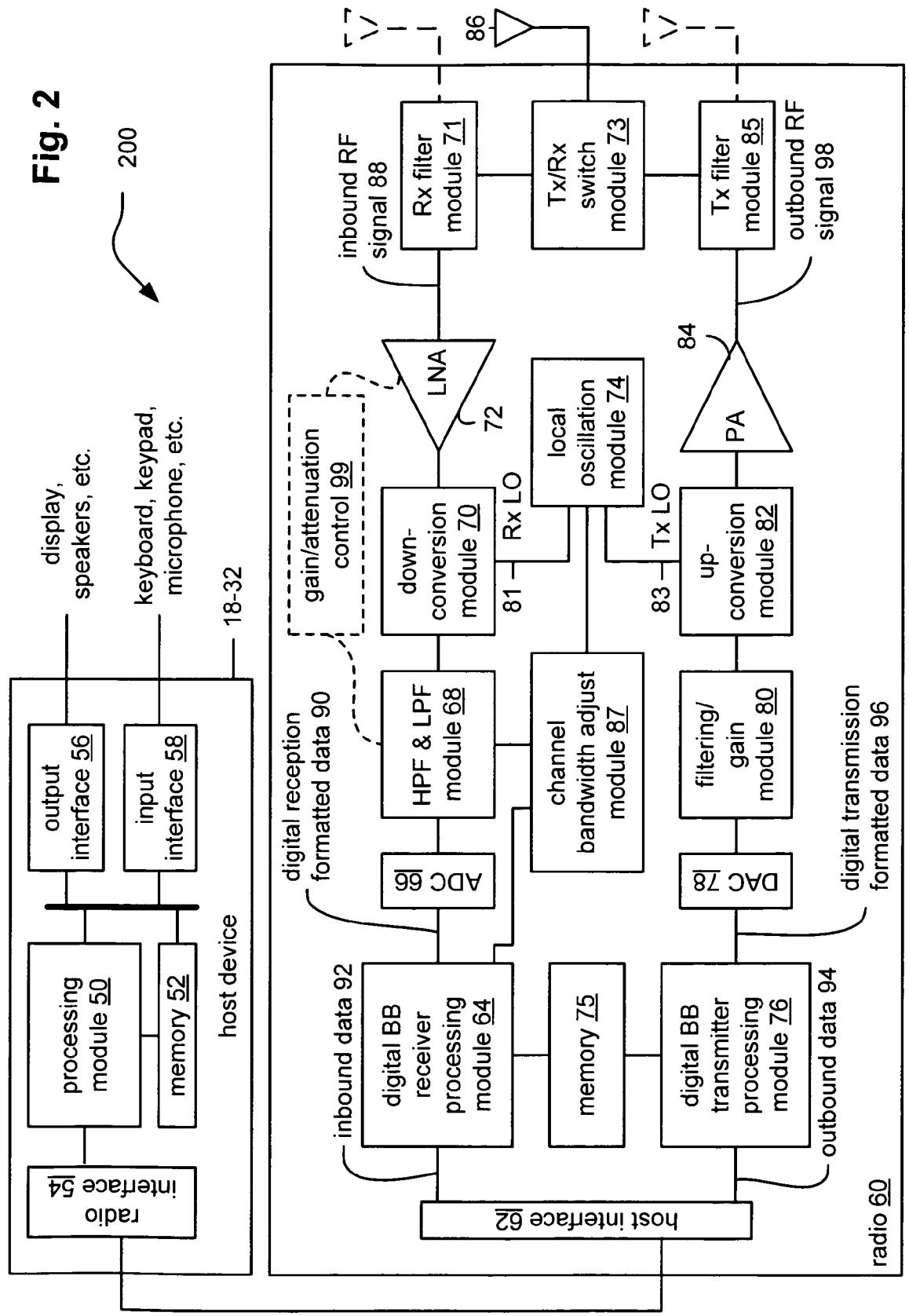
FIG. 2 is a diagram of a wireless communication device.

FIG. 2 is a diagram illustrating a wireless communication device 200 that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component.

As illustrated, the host device 18-32 includes a processing module 50, memory 52, a radio interface 54, an input interface 58, and an output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, et cetera such that the received data may be displayed. The radio interface 54 also provides data from the processing module 50 to the radio 60. The processing module 50 may receive the outbound data from an input device such as a keyboard, keypad, microphone, et cetera via the input interface 58 or generate the data itself. For data received via the input interface 58, the processing module 50 may perform a corresponding host function on the data and/or route it to the radio 60 via the radio interface 54.

Radio 60 includes a host interface 62, digital receiver processing module 64, an analog-to-digital converter 66, a high pass and low pass filter module 68, an IF mixing down conversion stage 70, a receiver filter 71, a low noise amplifier 72, a transmitter/receiver switch 73, a local oscillation module 74, memory 75, a digital transmitter processing module 76, a digital-to-analog converter 78, a filtering/gain module 80, an IF mixing up conversion stage 82, a power amplifier 84, a transmitter filter module 85, a channel bandwidth adjust module 87, and an antenna 86.

It is noted that one or both of the high pass and low pass filter module 68 and the low noise amplifier 72 can operate to perform any desired gain and/or attenuation of the inbound RF signal 88 (i.e., using the low noise amplifier 72) or the down-converted version thereof (i.e., using the high pass and low pass filter module 68), as indicated by the reference numeral 99. A packet gain signal can be provided from one or both of the high pass and low pass filter module 68 and the low noise amplifier 72 to indicate that the gain has settled (i.e., undergone any change, passed through any transient period, and settled to a new steady state operating level for the packet).

The antenna 86 may be a single antenna that is shared by the transmit and receive paths as regulated by the Tx/Rx switch 73, or may include separate antennas for the transmit path and receive path. The antenna implementation will depend on the particular standard to which the wireless communication device 200 is compliant.

The digital receiver processing module 64 and the digital transmitter processing module 76, in combination with operational instructions stored in memory 75, execute digital receiver functions and digital transmitter functions, respectively. The digital receiver functions include, but are not limited to, digital intermediate frequency to baseband conversion, demodulation, constellation demapping, decoding, and/or descrambling. The digital transmitter functions include, but are not limited to, scrambling, encoding, constellation mapping, modulation, and/or digital baseband to IF conversion. The digital receiver and transmitter processing modules 64 and 76 may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 75 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 64 and/or 76 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 94 from the host device via the host interface 62. The host interface 62 routes the outbound data 94 to the digital transmitter processing module 76, which processes the outbound data 94 in accordance with a particular wireless communication standard (e.g., IEEE 802.11, Bluetooth, et cetera) to produce outbound baseband signals 96. The outbound baseband signals 96 will be digital base-band signals (e.g., have a zero IF) or a digital low IF signals, where the low IF typically will be in the frequency range of one hundred kHz (kilo-Hertz) to a few MHz (Mega-Hertz).

The digital-to-analog converter 78 converts the outbound baseband signals 96 from the digital domain to the analog domain. The filtering/gain module 80 filters and/or adjusts the gain of the analog signals prior to providing it to the IF mixing stage 82. The IF mixing stage 82 converts the analog baseband or low IF signals into RF signals based on a transmitter local oscillation 83 provided by local oscillation module 74. The power amplifier 84 amplifies the RF signals to produce outbound RF signals 98, which are filtered by the transmitter filter module 85. The antenna 86 transmits the outbound RF signals 98 to a targeted device such as a base station, an access point and/or another wireless communication device 200.

The radio 60 also receives inbound RF signals 88 via the antenna 86, which were transmitted by a base station, an access point, or another wireless communication device. The antenna 86 provides the inbound RF signals 88 to the receiver filter module 71 via the Tx/Rx switch 73, where the Rx filter 71 bandpass filters the inbound RF signals 88. The Rx filter 71 provides the filtered RF signals to low noise amplifier 72, which amplifies the signals 88 to produce an amplified inbound RF signals. The low noise amplifier 72 provides the amplified inbound RF signals to the IF mixing module 70, which directly converts the amplified inbound RF signals into an inbound low IF signals or baseband signals based on a receiver local oscillation 81 provided by local oscillation module 74. The down conversion module 70 provides the inbound low IF signals or baseband signals to the filtering/gain module 68. The high pass and low pass filter module 68 filters, based on settings provided by the channel bandwidth adjust module 87, the inbound low IF signals or the inbound baseband signals to produce filtered inbound signals.

The analog-to-digital converter 66 converts the filtered inbound signals from the analog domain to the digital domain to produce inbound baseband signals 90, where the inbound baseband signals 90 will be digital base-band signals or digital low IF signals, where the low IF typically will be in the frequency range of one hundred kHz to a few MHz. The digital receiver processing module 64, based on settings provided by the channel bandwidth adjust module 87, decodes, descrambles, demaps, and/or demodulates the inbound baseband signals 90 to recapture inbound data 92 in accordance with the particular wireless communication standard being implemented by radio 60. The host interface 62 provides the recaptured inbound data 92 to the host device 18-32 via the radio interface 54.

As one of average skill in the art will appreciate, the wireless communication device 200 of FIG. 2 may be implemented using one or more integrated circuits. For example, the host device may be implemented on one integrated circuit, the digital receiver processing module 64, the digital transmitter processing module 76 and memory 75 may be implemented on a second integrated circuit, and the remaining components of the radio 60, less the antenna 86, may be implemented on a third integrated circuit. As an alternate example, the radio 60 may be implemented on a single integrated circuit. As yet another example, the processing module 50 of the host device and the digital receiver and transmitter processing modules 64 and 76 may be a common processing device implemented on a single integrated circuit. Further, the memory 52 and memory 75 may be implemented on a single integrated circuit and/or on the same integrated circuit as the common processing modules of processing module 50 and the digital receiver and transmitter processing module 64 and 76.

Figure 3:
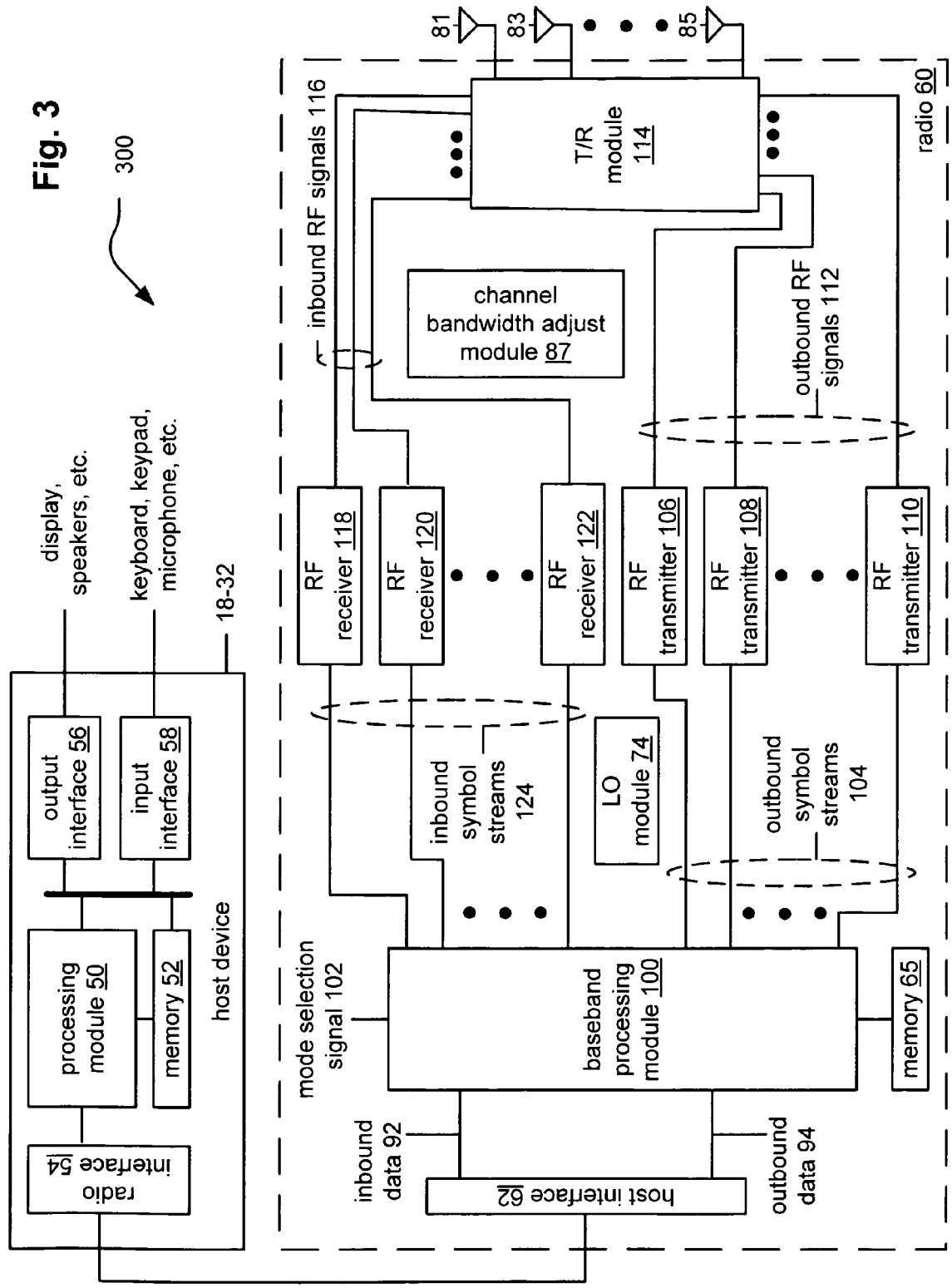
FIG. 3 is a diagram of another wireless communication device.

FIG. 3 is a diagram illustrating a wireless communication device 300 that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component.

As illustrated, the host device 18-32 includes a processing module 50, memory 52, radio interface 54, input interface 58 and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, et cetera such that the received data may be displayed. The radio interface 54 also provides data from the processing module 50 to the radio 60. The processing module 50 may receive the outbound data from an input device such as a keyboard, keypad, microphone, et cetera via the input interface 58 or generate the data itself. For data received via the input interface 58, the processing module 50 may perform a corresponding host function on the data and/or route it to the radio 60 via the radio interface 54.

Radio 60 includes a host interface 62, a baseband processing module 100, memory 65, a plurality of radio frequency (RF) transmitters 106-110, a transmit/receive (T/R) module 114, a plurality of antennas 81-85, a plurality of RF receivers 118-120, a channel bandwidth adjust module 87, and a local oscillation module 74. The baseband processing module 100, in combination with operational instructions stored in memory 65, executes digital receiver functions and digital transmitter functions, respectively. The digital receiver functions include, but are not limited to, digital intermediate frequency to baseband conversion, demodulation, constellation de-mapping, decoding, de-interleaving, fast Fourier transform (FFT), cyclic prefix removal, space and time decoding, and/or descrambling. The digital transmitter functions include, but are not limited to, scrambling, encoding, interleaving, constellation mapping, modulation, inverse fast Fourier transform (IFFT), cyclic prefix addition, space and time encoding, and digital baseband to IF conversion. The baseband processing modules 100 may be implemented using one or more processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 65 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 100 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 94 from the host device via the host interface 62. The baseband processing module 64 receives the outbound data 88 and, based on a mode selection signal 102, produces one or more outbound symbol streams 90. The mode selection signal 102 will indicate a particular mode of operation that is compliant with one or more specific modes of the various IEEE 802.11 standards. For example, the mode selection signal 102 may indicate a frequency band of 2.4 GHz, a channel bandwidth of 20 or 22 MHz and a maximum bit rate of 54 megabits-per-second. In this general category, the mode selection signal will further indicate a particular rate ranging from 1 megabit-per-second to 54 megabits-per-second. In addition, the mode selection signal will indicate a particular type of modulation, which includes, but is not limited to, Barker Code Modulation, BPSK, QPSK, CCK, 16 QAM and/or 64 QAM. The mode select signal 102 may also include a code rate, a number of coded bits per subcarrier (NBPSC), coded bits per OFDM symbol (NCBPS), and/or data bits per OFDM symbol (NDBPS). The mode selection signal 102 may also indicate a particular channelization for the corresponding mode that provides a channel number and corresponding center frequency. The mode select signal 102 may further indicate a power spectral density mask value and a number of antennas to be initially used for a MIMO communication.

The baseband processing module 100, based on the mode selection signal 102 produces one or more outbound symbol streams 104 from the outbound data 94. For example, if the mode selection signal 102 indicates that a single transmit antenna is being utilized for the particular mode that has been selected, the baseband processing module 100 will produce a single outbound symbol stream 104. Alternatively, if the mode select signal 102 indicates 2, 3 or 4 antennas, the baseband processing module 100 will produce 2, 3 or 4 outbound symbol streams 104 from the outbound data 94.

Depending on the number of outbound streams 104 produced by the baseband module 10, a corresponding number of the RF transmitters 106-110 will be enabled to convert the outbound symbol streams 104 into outbound RF signals 112. In general, each of the RF transmitters 106-110 includes a digital filter and upsampling module, a digital to analog conversion module, an analog filter module, a frequency up conversion module, a power amplifier, and a radio frequency bandpass filter. The RF transmitters 106-110 provide the outbound RF signals 112 to the transmit/receive module 114, which provides each outbound RF signal to a corresponding antenna 81-85.

When the radio 60 is in the receive mode, the transmit/receive module 114 receives one or more inbound RF signals 116 via the antennas 81-85 and provides them to one or more RF receivers 118-122. The RF receiver 118-122, based on settings provided by the channel bandwidth adjust module 87, converts the inbound RF signals 116 into a corresponding number of inbound symbol streams 124. The number of inbound symbol streams 124 will correspond to the particular mode in which the data was received. The baseband processing module 100 converts the inbound symbol streams 124 into inbound data 92, which is provided to the host device 18-32 via the host interface 62.

As one of average skill in the art will appreciate, the wireless communication device 300 of FIG. 3 may be implemented using one or more integrated circuits. For example, the host device may be implemented on one integrated circuit, the baseband processing module 100 and memory 65 may be implemented on a second integrated circuit, and the remaining components of the radio 60, less the antennas 81-85, may be implemented on a third integrated circuit. As an alternate example, the radio 60 may be implemented on a single integrated circuit. As yet another example, the processing module 50 of the host device and the baseband processing module 100 may be a common processing device implemented on a single integrated circuit. Further, the memory 52 and memory 65 may be implemented on a single integrated circuit and/or on the same integrated circuit as the common processing modules of processing module 50 and the baseband processing module 100.

Figure 4:
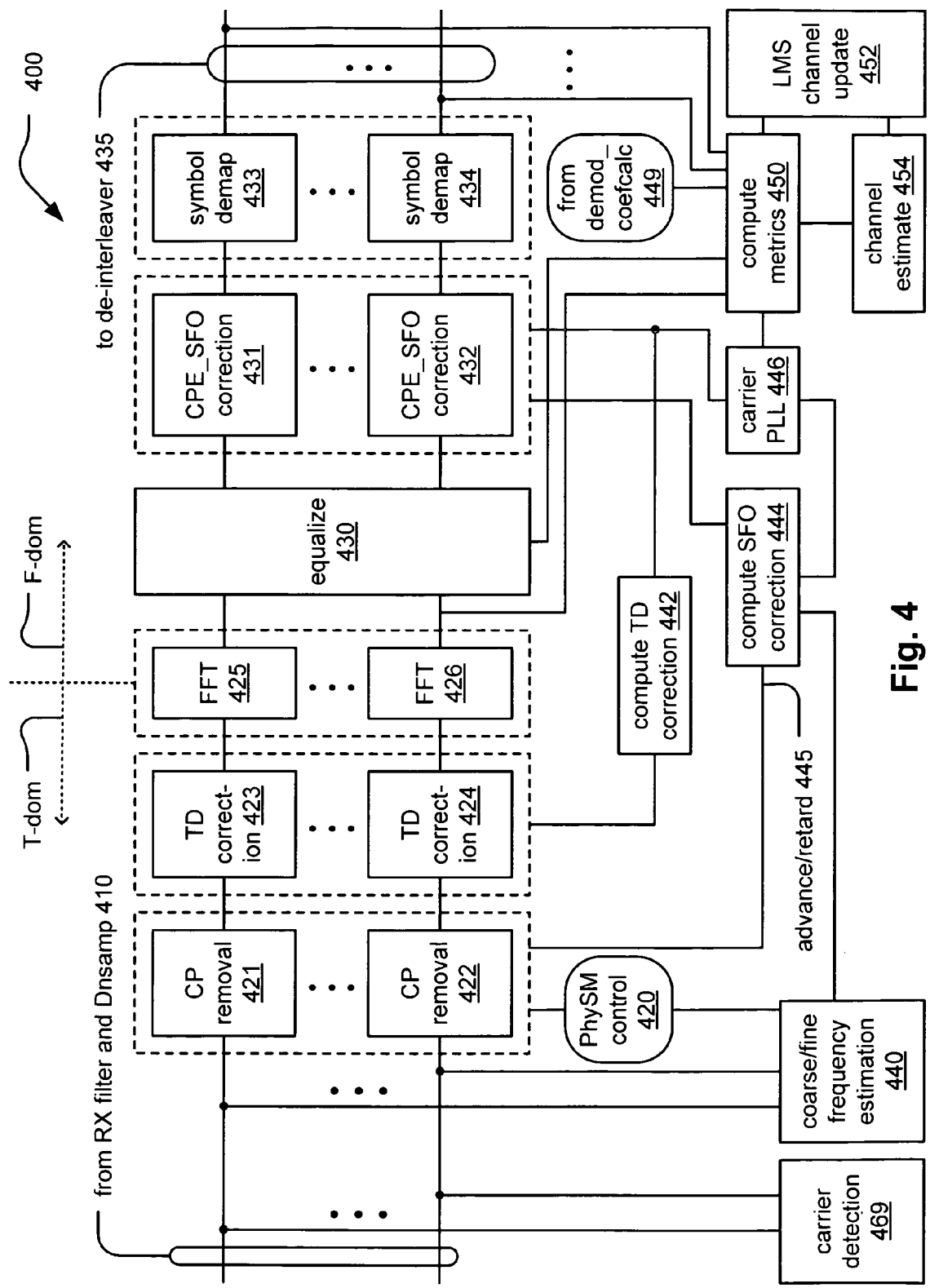
FIG. 4 is a diagram of feedback control within a communication device.

FIG. 4 is a diagram of feedback control 400 within a communication device. Initially, a plurality of signals, indicated by reference numeral 410, is received after undergoing receive filtering and down sampling. Such initial processing as receive filtering and down sampling may be viewed as being performed within an AFE (Analog Front End) of a communication device. In some embodiments, the feedback control 400 may be viewed may be viewed as being performed in a baseband processing module as depicted in some other of the embodiments disclosed herein.

Within this feedback control 400, a carrier detection module 469 is operable to perform carrier detection in accordance with any one of the various embodiments or equivalents described herein. Also, within this feedback control 400, a coarse/fine frequency estimation module 440 is operable to perform initially coarse frequency estimation and then subsequently fine frequency estimation as governed by PHY (physical layer) control, as indicated by PhySM control input 420.

Also within this feedback control 400, cyclic prefix (CP) removal of this incoming signal streams may be performed as shown by the CP removal modules 421-422; the operation of these CP modules 421-422 is also governed by PHY control, as indicated by PhySM control input 420. The CP removal functionality is based on an advance/retard signal 445 provided from a compute SFO (Sampling Frequency Offset) correction module 444 that operates using inputs received from a carrier PLL (Phase Locked Loop) 446 and the coarse/fine frequency estimation module 440.

Thereafter, predictive time-domain (TD) PLL correction is computed using a plurality of TD correction modules 423-424 (based on signals received from the carrier PLL 446 that correspond to a previous plurality of received symbols (e.g., previous N-$1^{st}$ symbol in one embodiment)). These outputs from the TD correction modules 423-424 are then passed to a plurality of FFT (Fast Fourier Transform) modules 425-426. These FFT modules 425-426 operate to transform the signal processing from the time domain (T-dom) to the frequency domain (F-dom). An equalize module 430 is operable to perform equalization on the signals received from the FFT modules 425-426. The equalize module 430 may be viewed as performing essentially a channel inversion operation on the signals received from the FFT modules 425-426 in an effort to compensate for, at least in part, the imperfections and deleterious characteristics of the communication channel over which a signal has been transmitted and from which the signal has been received. During a first instance, this equalize module 430 may be viewed as performed a $1^{st}$ pass of equalization, in that, the equalize processing may be viewed as being an iterative type process that compensates for any channel induced errors.

After this, these equalized signal streams are passed to a plurality of CPE_SFO correction modules 431-432 that is operable to apply predictive SFO correction that has been computed using a previous plurality of symbols (e.g., previous n-$1^{st}$ symbol in one embodiment) while also considering common phase error (CPE) correction values. The CPE_SFO correction modules 431-432 receive input signals from both the compute SFO correction module 444 as well as the carrier PLL 446. In an initial pass through the, the CPE correction value may be set to a phase of 0 (zero). The streams output from the CPE_SFO correction modules 431-432 are then provide to a plurality of symbol demap modules 433-434 that is operable to perform the appropriate symbol demapping of each of the symbols of these sequences of discrete values modulation symbols according to the appropriate modulation types (i.e., each modulation type includes a constellation shape and a corresponding mapping).

A compute metrics module 450 is operable to compute the CPE correction values. These CPE correction values are then filtered by the carrier PLL 446 before being provided to the CPE_SFO correction modules 431-432. A compute TD correction module 442 then computes the TD PLL correction from the current symbol (e.g., the $n^{th}$ symbol) for use with respect to the next symbol (e.g., n+$1^{st}$ symbol). The compute SFO correction module 444 then computes the SFO correction from the current symbol (e.g., the nth symbol) for use with respect to the next symbol (e.g., n+$1^{st}$ symbol). The equalize module 430 is then also adjusted using the SFO correction values that have been calculated using the compute metrics module 450.

The same SFO correction values computed and applied for the predictive SFO correction employed above as applied in conjunction with the CPE correction values from the current symbol (e.g., the $n^{th}$ symbol). In this pass of the feedback control processing, the CPE correction has the current symbol phase estimate that has been calculated as described above. The plurality of symbol demap modules 433-434 is then operable to perform the appropriate symbol demapping of each of the symbols again. After this step, an LMS channel update module 452 is then operable to compute the LMS (Least Means Square) channel update error terms for use by the next symbol (e.g., $n+1^{st}$ symbol). The LMS channel update module 452 then is operable to provide updated channel information to a channel estimate module 454 for processing the next symbol (e.g., $n+1^{st}$ symbol).

The compute metrics module 450 is operable to perform a variety of functions. The compute metrics module 450 is operable to compute the angular phase error, θ(est) or θ̂, between the outputs of the equalize module 430 and the expected constellation points of the expected modulation (having the expected constellation shape and corresponding mapping). This is employed by the carrier PLL 446 for CFO/SFO tracking by each of the corresponding appropriate modules.

The compute metrics module 450 is also operable to compute the error, $\Delta H_k$, between a received vector and an expected vector based on an expected constellation point. This is employed by the LMS channel update module 452.

The compute metrics module 450 is also operable to determine a signal type (shown by sig_type) that indicates the modulation type of the SIG field as is known within an OFDM packet employed in accordance with IEEE 802.11 n.

The compute metrics module also receives the appropriate 1 or more coefficients are received as shown by reference numeral 449 that are employed to calculate the location of the expected modulation (constellation and mapping) to which the received signal is symbol demapped. These may be provided via the signal, indicated by reference numeral 449, that operates by receiving coefficients from a demod_coefcalc module.

It is noted that the feedback control 400 within a communication device may be viewed as being implemented within a communication system operating using OFDM (Orthogonal Frequency Division Multiplexing) signaling.

Several of the following embodiments are directed towards performing carrier detection when processing an OFDM packet that is processed from a signal that has been received from a communication channel. The carrier detection functionality and methods presented herein are applicable to any of a variety of communication systems including those having more than one receive stream. Generally speaking, these carrier detection functionality and methods may be applied to any received signal.

Figure 5:
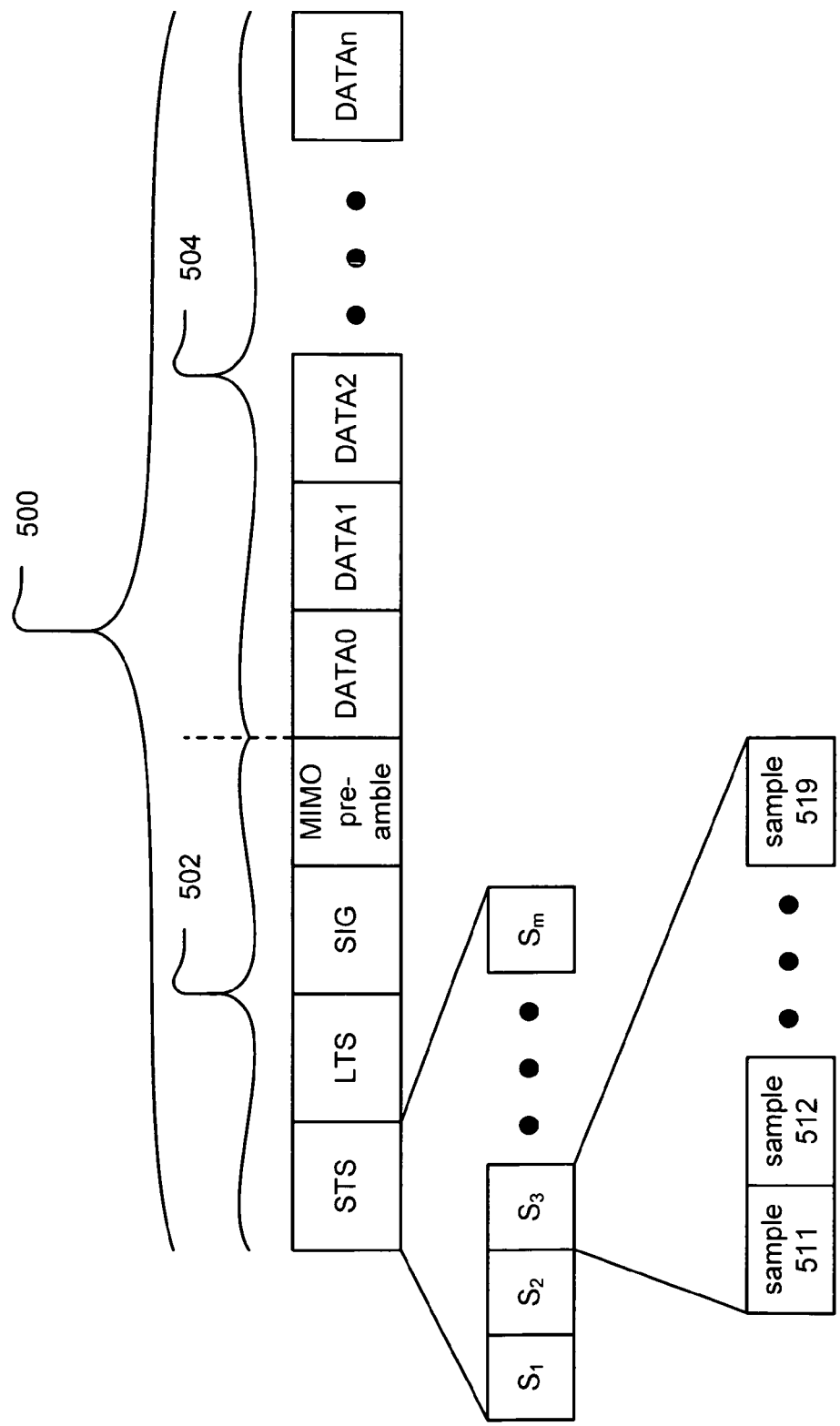
FIG. 5 is a diagram illustrating an embodiment of an OFDM (Orthogonal Frequency Division Multiplexing) packet that may be processed.

FIG. 5 is a diagram illustrating an embodiment of an OFDM (Orthogonal Frequency Division Multiplexing) packet 500 that may be processed.

The OFDM packet 500 may be viewed as including a preamble portion 502 and a data portion 504. The leftmost portion of the OFDM packet 500 is the demarcation of the start of packet (SOP) and the rightmost portion of the OFDM packet 500 is the demarcation of the end-of-packet (EOP). The preamble portion 502 of the OFDM packet 500 is relatively short in time compared to the overall packet length of the OFDM packet 500, and corrections and calculations for other system impairments such as carrier frequency detect, carrier recovery, timing recovery, CFO (Carrier Frequency Offset), and others may also need to be calculated during this portion of the transmission. Thus, the amount of time needed to determine such parameters for a received OFDM packet 500 needs to be kept small.

The preamble portion 502 may be divided into several training sequences. For example, first a short training sequence (STS) may be received. This is followed by a long training sequence (LTS), signal field (SIG), and an additional short training sequence (MIMO STS). The SIG portion of the preamble may describe the content of data with information provided in a predetermined format.

It is also noted here that the preamble portion 502 may include a wide variety of combinations of STSs, LTSs, and SIGs. In addition, the order of each of these various types of training sequences (STSs, LTSs, and SIGs) may be in any desired order within the preamble portion 502. The particular arrangement of the preamble portion 502 within this diagram is illustrative of just one possible embodiment. Clearly, variations thereof may be implemented without departing from the scope and spirit of the invention.

In the context of carrier detect functionality and method implemented to perform carrier detection, the operation and processing may be performed on the STS. Each of the portions of the OFDM packet 500 may be viewed as including more than 1 OFDM symbol. For example, the STS of the preamble portion 502 of the OFDM packet 500 may include a plurality of OFDM symbols, shown as $S_1, S_2, S_3, \ldots, S_m$. Clearly, the STS could possibly include as few as 2 OFDM symbols in some embodiments. Each of the OFDM symbols includes a plurality of samples. For example, the OFDM symbol $S_2$ includes sample 511, sample 512, and ..., sample 519. Clearly, this relationship may also be applicable for other of the OFDM symbols as well, in that, each OFDM symbol includes a corresponding plurality of samples.

Figure 6:
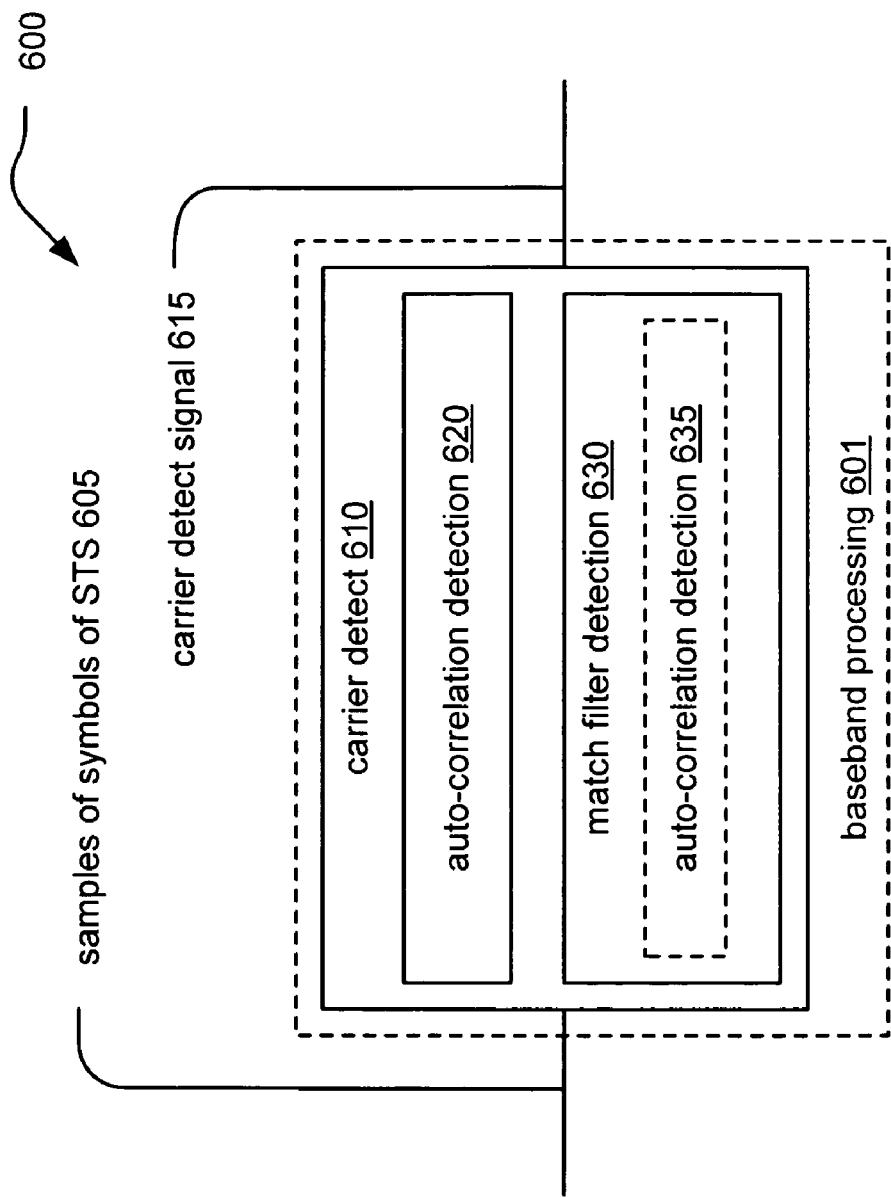
FIG. 6 is a diagram illustrating an embodiment of functionality operable to perform carrier detection.

FIG. 6 is a diagram illustrating an embodiment of functionality 600 operable to perform carrier detection. This embodiment shows a very generic embodiment by which a carrier detect module 610 may be implemented. In some desired embodiments, the carrier detect module 610 may be implemented within a baseband processing module 601. This baseband processing module 601 may be the baseband processing module 100 shown above within other embodiments, or the baseband processing module 601 may include different functionality and capabilities as the baseband processing module 100 shown above.

The carrier detect module 610 is operable to receive samples of at least two symbols of an STS of an OFDM packet, as indicated by the reference numeral 605. The carrier detect module 610 includes an auto-correlation detection module 620 and a match filter detection module 630. In some instances, the match filter detection module 630 also includes an auto-correlation detection module 635 that is distinct from the auto-correlation detection module 620, in that, the auto-correlation detection module 635 operates using a relaxed set of parameters when compared to the parameters employed by the an auto-correlation detection module 620. Operating cooperatively, the auto-correlation detection module 620 and the match filter detection module 630 operate on the samples of at least two symbols of an OFDM packet to generate a carrier detect signal 615. This carrier detect signal 615 then indicates carrier detect or not (i.e., a carrier signal has been sensed and detected or no carrier signal has been sensed and detected).

Figure 7:
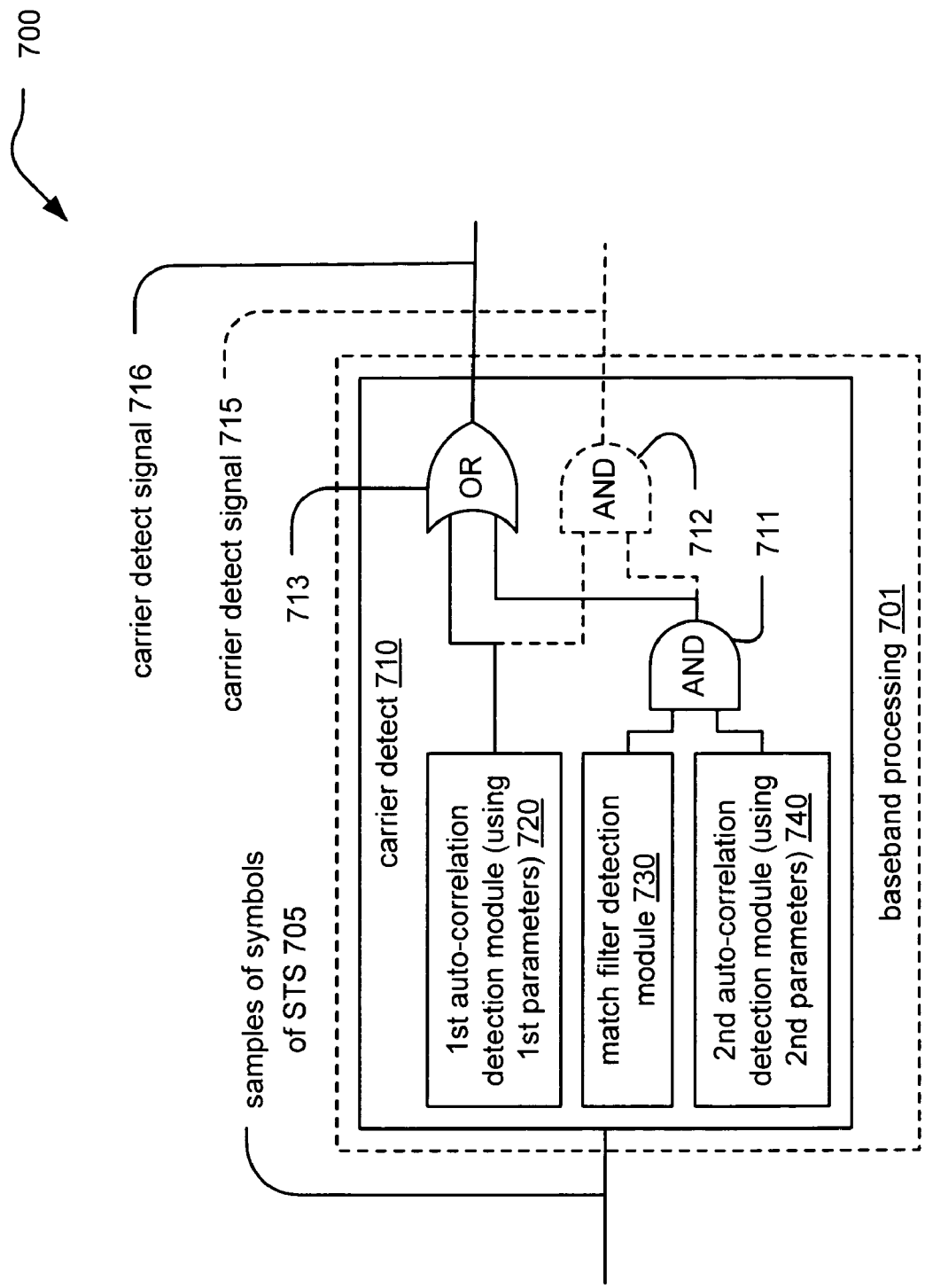
FIG. 7 is a diagram illustrating another embodiment of functionality operable to perform carrier detection.

FIG. 7 is a diagram illustrating another embodiment of functionality 700 operable to perform carrier detection. It is noted that this diagram corresponds to an embodiment for use in performing carrier detection within a single received signal stream. This embodiment 700 could also be replicated and employed to perform carrier detection among a number of received signal streams as well. In such a multiple received signal stream embodiment, if the embodiment 700 were replicated (one for each received signal stream), then each embodiment 700 would provide a carrier detect signal for that particular received signal stream, and the results of all of the embodiments 700 (i.e., one for each received signal stream) could be combined for overall carrier detection. For example, in such a multiple received signal stream embodiment, a combining module can be employed to perform the combining functionality according to a desired manner for a given application. At least one such possible embodiment is described below.

In some desired embodiments, a carrier detect module 710 may be implemented within a baseband processing module 701. This baseband processing module 701 may be the baseband processing module 100 shown above within other embodiments, or the baseband processing module 701 may include different functionality and capabilities as the baseband processing module 100 shown above.

Similar to the embodiment described just above, the carrier detect module 710 is operable to receive samples of at least two symbols of an STS of an OFDM packet, as indicated by the reference numeral 705. In this embodiment, the carrier detect module 710 includes a $1^{st}$ auto-correlation detection module 720, a match filter detection module 730, and a $2^{nd}$ auto-correlation detection module 740. The $1^{st}$ auto-correlation detection module 720 is operable to process the samples of at least 2 symbols of an OFDM packet to generate a first carrier detect signal, and the $2^{nd}$ auto-correlation detection module 740 is operable to process the samples of at least 2 symbols of an OFDM packet to generate a second carrier detect signal. The match filter detection module 730 is operable to process samples of at least 1 symbol of an OFDM packet as compared to a predetermined symbol as determined using match filter parameters corresponding thereto; the match filter detection module 730 is operable to generate a match filter detection signal.

The carrier detect module 710 also includes at least one embodiment of some logic circuitry and/or logic functional blocks that are operable to process each of the first carrier detect signal, the match filter detection signal, and the second carrier detect signal. For example, in one possible embodiment, the match filter detection signal and the second carrier detect signal are provided to a first logical AND gate 711. In some alternative embodiments, the first logical AND gate 711 may be replaced by a logical OR gate.

The output of this first logical AND gate 711 is provided to a second logical AND gate 712 that also receives the first carrier detect signal. The output of this second logical AND gate 712 is a carrier detect signal 715 that indicates carrier detect or not (i.e., a carrier signal has been sensed and detected or no carrier signal has been sensed and detected).

In another possible embodiment, the match filter detection signal and the second carrier detect signal are provided to the first logical AND gate 711. The output of this first logical AND gate 711 is provided to a logical OR gate 713 that also receives the first carrier detect signal. The output of this logical OR gate 713 is a carrier detect signal 716 that indicates carrier detect or not (i.e., a carrier signal has been sensed and detected or no carrier signal has been sensed and detected). In this embodiment, either the signal output from the first logical AND gate 711 or the first carrier detect signal output from the $1^{st}$ auto-correlation detection module 720 is sufficient to direct the carrier detect signal 716 to indicate carrier detect or not.

A designer is given great latitude by which to combine each of the first carrier detect signal, the match filter detection signal, and the second carrier detect signal. Each of these two possible embodiments of logic circuitry may be implemented within a single carrier detect module in some embodiments, and selection may be made regarding which of the two possible embodiments to employ.

More detail is provided below showing greater detail by which each of these various embodiments of these auto-correlation detection modules and match filter detection modules may be implemented.

Figure 8:
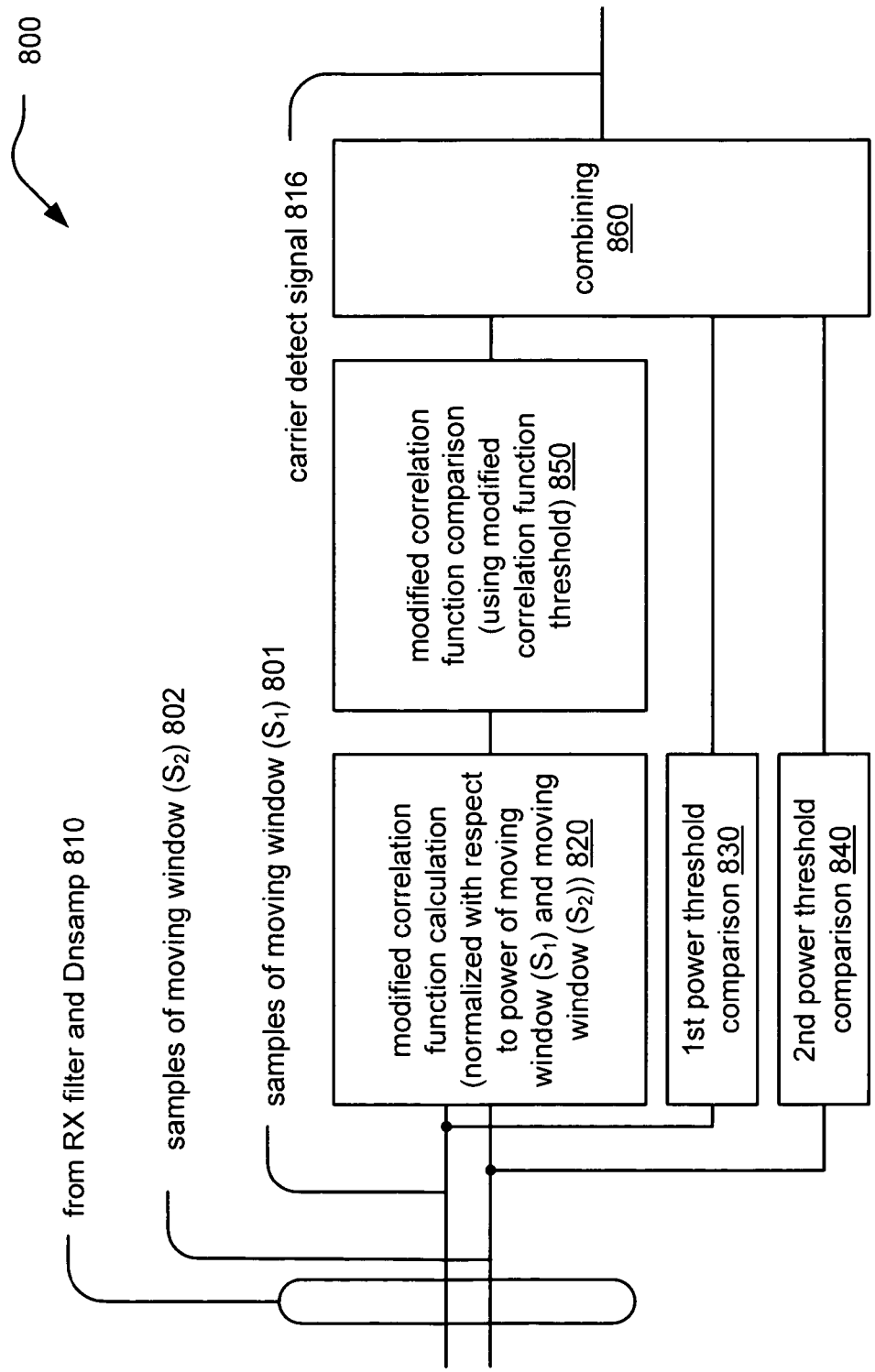
FIG. 8 is a diagram illustrating an embodiment of functionality operable to support auto-correlation detection processing.

FIG. 8 is a diagram illustrating an embodiment of functionality 800 operable to support auto-correlation detection processing. Modified correlation function calculation 820 is performed when operating on the samples of two moving windows of an OFDM packet (e.g., as indicated by samples of moving window ($S_1$) 801 and samples of moving window ($S_2$) 802, respectively) that are processed and received after undergoing receive filtering and down sampling, as indicated by reference numeral 810. Such initial processing as receive filtering and down sampling may be viewed as being performed within an AFE (Analog Front End) of a communication device.

This modified correlation function calculation 820 differs from straight-forward auto-correlation function calculation, in that, the term is normalized with respect to the power of each of the moving windows of each of the samples of window 1 801 and the samples of window 2 802.

A strict auto-correlation function calculation, $\rho_{corr}$ of using the samples of moving window ($S_1$) 801 and samples of moving window ($S_2$) 802, would be performed as follows:

$$\rho_{corr} = \frac{E[S_1, S_2^*]}{\sqrt{P_{S_1}} \cdot \sqrt{P_{S_2}}} - m_{S_1} \cdot m_{S_2},$$

where:

$E[S_1, S_2^*]$ is the expected value when considering the samples of moving window ($S_1$) 801 and samples of moving window ($S_2$) 802;

$m_{S_1}$ is the mean value of the samples of moving window ($S_1$) 801;

$m_{S_2}$ is the mean value of the samples of moving window ($s_2$) 802;

$P_{S_1}$ the power of the samples of moving window ($S_1$) 801; and $P_{S_2}$ is the power of the samples of moving window ($S_2$) 802.

It is noted that $E[S_1, S_2^*]$ is calculated as a function of each of the samples of moving window ($S_1$) 801 and the samples of moving window ($S_2$) 802. For example, assuming the samples of $S_1$ includes n samples as $x_1, x_2, \ldots, x_n$, and the samples of $S_2$ includes n samples as $y_1, y_2, \ldots, y_n$ then the term, $E[S_1, S_2^*]$, is calculated as follows:

$$E[S_1, S_2^*] = \frac{x_1 y_1^* + x_2 y_2^* + \cdots x_n y_n^*}{n}.$$

For comparison, the covariance function calculation, $\rho_{cov}$, of using the samples of moving window ($S_1$) 801 and the samples of moving window ($S_2$) 802, would be performed as follows:

$$\rho_{cov} = \frac{E[S_1, S_2^*] - m_{S_1} \cdot m_{S_2}}{\sigma_{S_1} \cdot \sigma_{S_2}}, \text{ where:}$$

$\sigma_{S_1}$ is the standard deviation of the noise of the samples of moving window ($S_1$) 801; and $\sigma_{S_2}$ is the standard deviation of the noise of the samples of moving window ($S_2$) 802.

However, the modified correlation function calculation 820 (which is performed for every sample of each of the moving windows as depicted using, $S_1$ and $S_2$) is instead calculated as follows:

$$\rho_{mod\_corr} = \frac{E[S_1, S_2^*] - m_{S_1} \cdot m_{S_2}}{\sqrt{P_{S_1}} \cdot \sqrt{P_{S_2}}},$$

or alternatively after being squared as follows:

$$\rho_{mod\_corr}^2 = \frac{(E[S_1, S_2^*] - m_{S_1} \cdot m_{S_2})^2}{P_{S_1} \cdot P_{S_2}}.$$

As can be seen, the modified correlation function calculation 820 is normalized with respect to the power of each of the samples of moving window ($S_1$) 801 and samples of moving window ($S_2$) 802. This generally results in a smaller value than would either of the strict auto-correlation function calculation, $\rho_{corr}$, or the covariance function calculation, $\rho_{corr}$, thereby providing for less susceptibility to false carrier detects. By generating a smaller number, a carrier signal is a bit more difficult to detect, but this will provide for a more robust approach that reduces false carrier detects while also providing a very accurate carrier detect signal indicating that a carried signal is in fact detected (or sensed). Generally speaking, as the power of each of the samples of moving window ($S_1$) 801 and samples of moving window ($S_2$) 802, decreases, then the values of the modified correlation function increases.

The modified correlation function is monitored over a predetermined number of samples, and the modified correlation function is compared to a modified correlation function threshold as shown in a block 850. Typically, when the samples of moving window ($S_1$) 801 and samples of moving window ($S_2$) 802, are correlated, then the modified correlation function climbs to reach a peak and then decreases over a region before climbing again to a subsequent peak.

A designer is given great flexibility in how to implement these the criterion or criteria required to be met before declaring that carrier detect has been performed. For example, any of the thresholds employed herein can be modified. In some instances, the thresholds can be lowered when accompanied with requiring more consecutive peaks be detected within the modified correlation function threshold.

Also, this embodiments shows how the power of each of the samples of moving window ($S_1$) 801 and samples of moving window ($S_2$) 802, undergoes power comparison. Specifically, the power of the samples of moving window ($S_1$) 801, is compared to a $1^{st}$ power threshold as shown in a block 830; this comparison of the power of the symbol, $S_1$, is with respect to a $1^{st}$ power threshold. The power of the samples of moving window ($S_2$) 802, is compared to a $2^{nd}$ power threshold as shown in a block 840; this comparison of the power of samples of moving window ($S_2$) 802, is with respect to a $2^{nd}$ power threshold.

The outputs of each of these blocks 850, 830, and 840 are provided to a combining module 860. The combining module 860 may be viewed as performing the processing of each of the comparisons being performed in the blocks 850, 830, and 840 to determine whether or not a carrier detect signal 816 indicates that a carrier signal has in fact been detected or not.

In one possible embodiment, the carrier detect signal 816 indicates carrier detect of a signal being monitored when: (1) the modified correlation function exceeds the modified correlation function threshold, (2) the first power corresponding to the first symbol exceeds the first power threshold, and (3) the second power corresponding to the second symbol exceeds the second power threshold. When all three of these conditions are not met, then the carrier detect signal 816 does in fact indicate carrier detect, and when at least one of these conditions is not met, then the carrier detect signal 816 does not indicate carrier detect.

Figure 9:
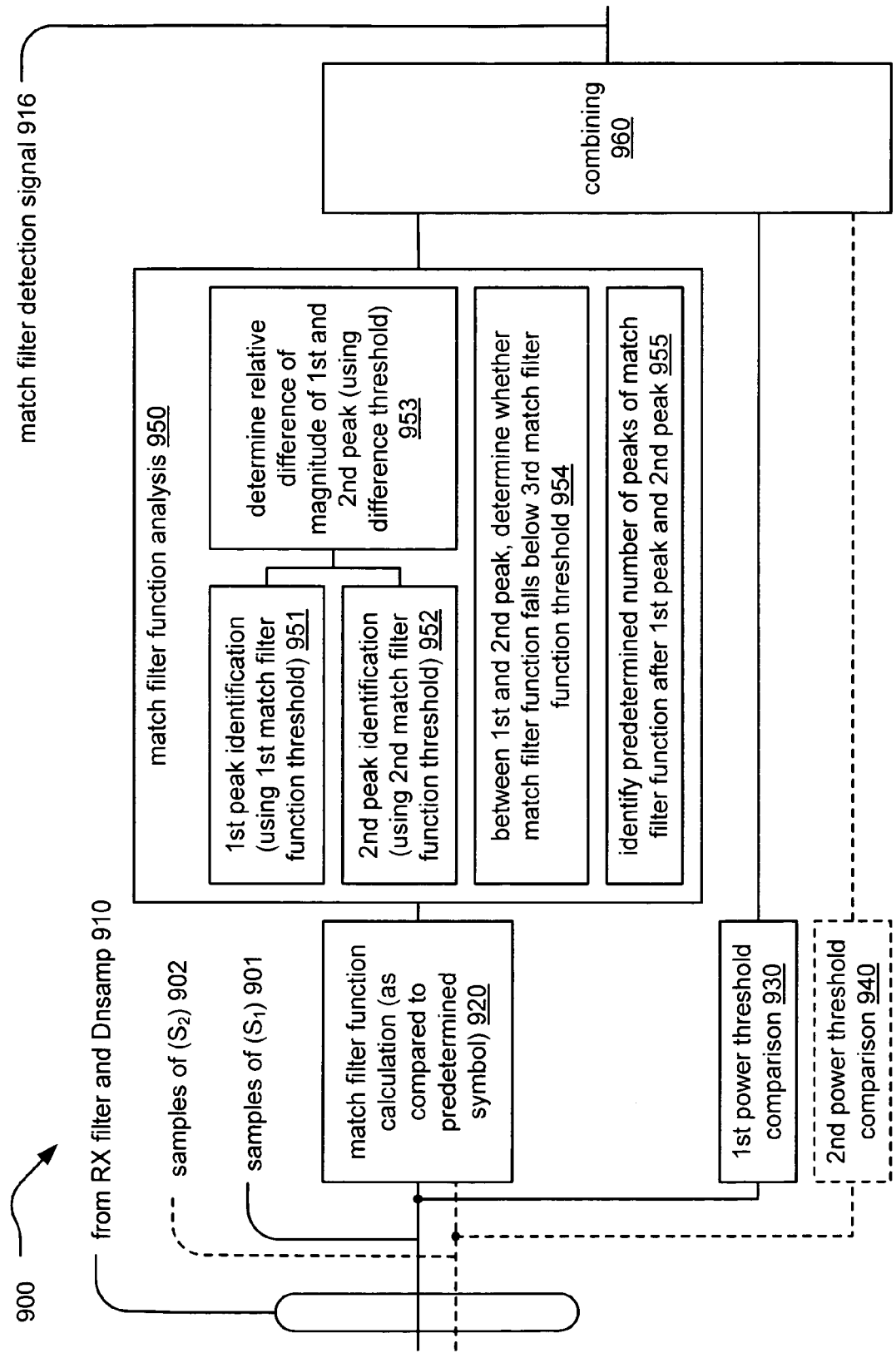
FIG. 9 is a diagram illustrating an embodiment of functionality operable to support match filter detection processing.

FIG. 9 is a diagram illustrating an embodiment of functionality 900 operable to support match filter detection processing. Initially, a plurality of signals, indicated by reference numeral 910, is received after undergoing receive filtering and down sampling. Analogous to other embodiments, such initial processing as receive filtering and down sampling may be viewed as being performed within an AFE (Analog Front End) of a communication device.

Match filter function calculation 920 is performed when operating on the samples of successive different symbols of an OFDM packet (e.g., $S_1$ and $S_2$, as indicated by reference numerals 901 and 902, respectively).

The match filter function calculation 920 is performed using the samples of each of the symbols, $S_1$ and $S_2$, as compared to samples of a predetermined symbol. Each of these samples undergoes match filter processing performed with respect to the samples of the predetermined symbol thereby generating a match filter output signal, MF_out. Generally speaking, the $n^{th}$ sample of each of the symbols, $S_1$ and $S_2$, is processed within the corresponding sample, $S_{known}^*$ (−n), of the predetermined/known symbol. The received symbol, $S_1$, is then correlated with a predetermined/known sequence (e.g., the predetermined/known symbol, $S_{known}$) thereby generating a match filter function, $\rho_{MF}$. This match filter function calculation 920 to generate the match filter function, $\rho_{MF}$ is performed using the match filter output signal, MF_out, and some of the various characteristics and measures of the predetermined/known symbol. For example, the match filter function, $\rho_{MF}$, may be calculated as follows:

$$\rho_{MF} = \frac{MF\_out - m_{S_1} \cdot m_{S_{known}}}{\sqrt{P_{S_1}} \cdot \sqrt{P_{S_{known}}}}, \text{ where:}$$

MF_out is the match filter output signal generated using one of the received symbols (e.g., $S_1$) and the predetermined/known symbol, $S_{known}$;

$m_{S_1}$ is the mean value of the symbol, $S_1$;

$m_{S_{known}}$ is the mean value of the predetermined/known symbol, $S_{known}$;

$P_{S_1}$ is the power of the symbol, $S_1$; and $P_{S_{known}}$ is the power of the predetermined/known symbol, $S_{known}$.

However, by the very design and definition of the predetermined/known symbol, $S_{known}$, and the design of the STS of an OFDM packet as described herein, the value of $m_{S_{known}}$ is zero (i.e., $m_{S_{known}}=0$). Therefore, the match filter function, $\rho_{MF}$, may be calculated as follows:

$$\rho_{MF} = \frac{MF\_out}{\sqrt{P_{S_1}} \cdot \sqrt{P_{S_{known}}}},$$

or alternatively after being squared as follows:

$$\rho_{MF}^2 = \frac{(MF\_out)^2}{P_{S_1} \cdot P_{S_{known}}}.$$

Once the match filter function has been (and continues to be) calculated for the samples of the various symbols of the STS of an OFDM packet, match filter function analysis is performed, as shown in a block 950.

For example, as shown in a block 951, the match filter function analysis 950 is operable to perform $1^{st}$ peak identification within the match filter function as shown in a block 951. This is performed using a $1^{st}$ match filter function threshold (e.g., $Th_{MF1}$). Analogously, the match filter function analysis 950 is operable to perform $2^{nd}$ peak identification within the match filter function as shown in a block 952. This may be performed using a $2^{nd}$ match filter function threshold (e.g., $Th_{MF2}$).

Also, as shown in a block 953, the match filter function analysis 950 is operable to determine the relative difference of magnitude between the $1^{st}$ peak of the match filter function and the match filter function at an expected location of a $2^{nd}$ peak (e.g., $\Delta_{P1+\Delta t-P1}$). This may be performed to determine whether the $1^{st}$ peak and the $2^{nd}$ peak are of approximately similar magnitude. This is also determined as a function of the periodicity between the $1^{st}$ peak and the $2^{nd}$ peak. For example, this may be calculated as a function of a difference threshold (which may be represented as $Th_{diff}$) that may be selected by a designer.

$$\Delta_{P1+\Delta t-P1} = |\rho_{MF}^2(n_{P1}+\Delta t) - \rho_{MF}^2(n_{P1})| < Th_{diff},$$

where:

$\rho_{MF}^2(n_{P1})$ is the match filter function corresponding to the sample, $n_{P1}$, that corresponds to the $1^{st}$ peak;

$\rho_{MF}^2(n_{P1}+\Delta t)$ is the match filter function corresponding being a predetermined period of time away from the sample, $n_{P1}$, associated with the $1^{st}$ peak; this generally will correspond to the location of the that corresponds to the $2^{nd}$ peak that is spaced an approximate period of time (e.g., $\Delta t$) from the $1^{st}$ peak (this term $\Delta t$ may be predetermined in some embodiments, e.g., a particular period of time such as 0.8 μsec); and $Th_{diff}$ is the designer selected threshold employed to compare this function's difference.

Alternatively, an actual difference, $\Delta_{P1-P2}$, between the $1^{st}$ peak and the actual $2^{nd}$ peak can be calculated directly as follows:

$$\Delta_{P1-P2} = |\rho_{MF}^2(n_{P2}) - \rho_{MF}^2(n_{P1})| < Th_{diff},$$

where:

$\rho_{MF}^2(n_{P1})$ is the match filter function corresponding to the sample, $n_{P1}$, that corresponds to the $1^{st}$ peak;

$\rho_{MF}^2(n_{P2})$ is the match filter function corresponding to the sample, $np_{P2}$, that corresponds to the $2^{nd}$ peak; and $Th_{diff}$ is the designer selected threshold employed to compare this function's difference.

Also, as shown in a block 954, the match filter function analysis 950 is operable to determine whether match filter function falls below $3^{rd}$ match filter function threshold between $1^{st}$ and $2^{nd}$ peak of the match filter function.

This $3^{rd}$ match filter function threshold may be represented as $Th_{fall}$, and this operation in the block 954 may be expressed mathematically as follows:

$$\rho_{MF}^2(n_{P1}) - \rho_{MF}^2(n_v) > Th_{fall},$$

where:

$\rho_{MF}^2(n_{P1})$ is the match filter function corresponding to the sample, $n_{P1}$, that corresponds to the $1^{st}$ peak;

$\rho_{MF}^2(n_{v_1})$ is the match filter function corresponding to the sample, $n_{v_1}$, that corresponds to a particular distance (e.g. in terms of samples) along the match filter function from the $1^{st}$ peak (this sample, $n_{v_1}$, and its distance from the sample, $n_{P1}$, may be predetermined and/or selected by a designer); and $Th_{fall}$ is the designer selected threshold employed to compare this difference.

Then, as shown in a block 955, the match filter function analysis 950 is operable to identify a predetermined number of peaks of match filter function after $1^{st}$ peak and $2^{nd}$ peak. The number of peaks to be identified may be selected by a designer (e.g., N peaks). This is to ensure that the match filter function is in fact periodic over a reasonable amount of time.

Also, this embodiments shows how the power of each of the symbols, $S_1$ and $S_2$, undergoes power comparison. Specifically, the power of the symbol, $S_1$, is compared to a $1^{st}$ power threshold as shown in a block 930; this comparison of the power of the symbol, $S_1$, is with respect to a $1^{st}$ power threshold. The power of the symbol, $S_2$, is compared to a $2^{nd}$ power threshold as shown in a block 940; this comparison of the power of the symbol, $S_2$, is with respect to a $2^{nd}$ power threshold.

The outputs of each of these blocks 950, 930, and 940 are provided to a combining module 960. The combining module 960 may be viewed as performing the processing of each of the comparisons being performed in the blocks 950, 930, and 940 to determine whether or not the symbols, $S_1$ and $S_2$, in fact comport sufficiently with the predetermined/known symbol as indicated by a match filter detection signal 916. The match filter detection signal 916 indicates whether each of the symbols, $S_1$ and $S_2$, sufficiently corresponds to the predetermined/known symbol.

In one possible embodiment, the match filter detection signal 916 indicates sufficient match filter correlation between a received symbol and a predetermined/known symbol when: (1) the first peak of the match filter function exceeds the first match filter function threshold, (2) the second peak of the match filter function exceeds the second match filter function threshold, (3) the difference in magnitude between the first peak and the second peak is less than a difference threshold, (4) the match filter function falls below a third match filter function threshold between the first peak and the second peak, (5) the first power corresponding to the first symbol exceeds a corresponding first power threshold, (6) and the second power corresponding to the second symbol exceeds a corresponding second power threshold.

Also, as indicated by the dotted lines, this functionality 900 may be implemented to process only one symbol (shown as $S_1$) at a time. If desired, to provide for some efficiency between the functionality 800 and the functionality 900, the samples of each of the symbols, $S_1$ and $S_2$, may be provided simultaneously to borrow on certain of the parallel type processing. For example, each of the functionality 800 and the functionality 900 perform power threshold comparison.

It is also noted that unique and different power thresholds may be employed for each of these corresponding threshold comparisons being performed in each of the embodiments of the functionality 800 of the FIG. 8 and the functionality 900 of the FIG. 9. A designer is provided significant freedom and latitude to select the particular thresholds employed herein.

It is also noted that any embodiment that employs multiple auto-correlation modules (e.g., the functionality 700 of the FIG. 7), different sets of parameters may be employed for each of those auto-correlation modules. For example, a $1^{st}$ auto-correlation module may employ a $1^{st}$ plurality of parameters such that its decision-making criteria is more stringent than a $2^{nd}$ auto-correlation module that employs a $2^{nd}$ plurality of parameters. The use and selection of certain thresholds employed by each of these auto-correlation modules ensures that they operate differently and may provide carrier detect signals indicating carrier detect under slightly different conditions.

Figure 10:
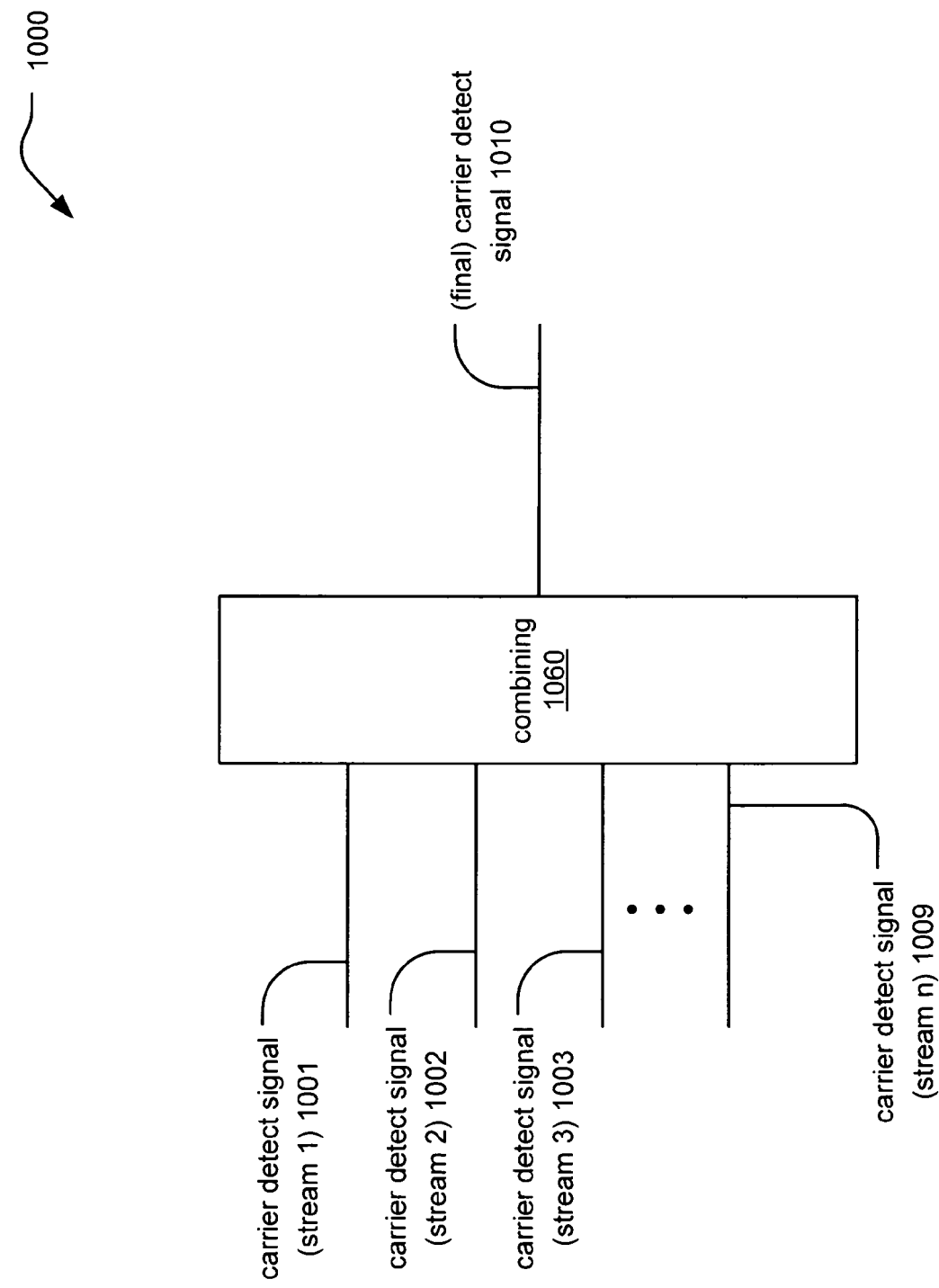
FIG. 10 is a diagram illustrating an embodiment of functionality operable to combining carrier detect signals from multiple streams into a single carrier detect signal.

FIG. 10 is a diagram illustrating an embodiment of functionality 1000 operable to combining carrier detect signals from multiple streams into a single carrier detect signal 1010 (e.g., a final carrier detect signal). As can be seen, multiple carrier detect signals are provided to a combining module 1060. Each of these carrier detect signals can be viewed as corresponding to a stream. For example, a carrier detect signal 1001 corresponds to a stream 1, a carrier detect signal 1002 corresponds to a stream 2, and a carrier detect signal 1003 corresponds to a stream 3. Generally speaking, carrier detect signals corresponding to n streams can be received by the combining module 1060, as shown by a carrier detect signal 1009 corresponds to a stream n. Any number of streams (i.e., as few as 2 streams) can be employed.

Each of these carrier detect signals may be generated using any of the embodiments described herein for a single stream. For example, each carrier detect signal may be generated using functionality of FIG. 6, FIG. 7, and/or FIG. 8.

The combining module 1060 can employ any desired means of performing combining of the multiple carrier detect signals into a carrier detect signal 1010. In some embodiments, logic circuitry (which can include and OR gates, as desired in the implementation) can be employed to make a final decision of carrier detection based on the success/failure of each of the streams.

Figure 11:
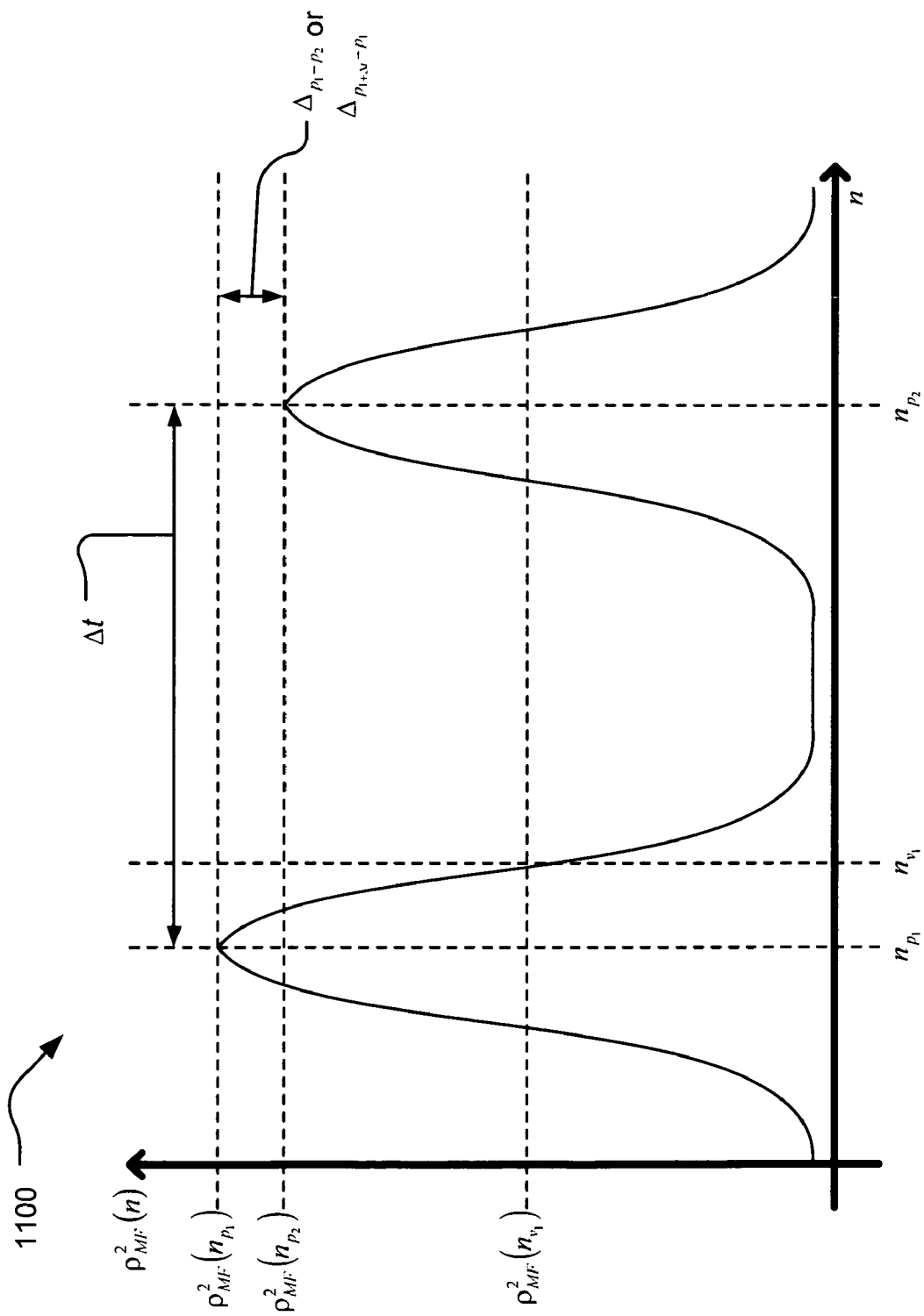
FIG. 11 is a diagram illustrating an embodiment of a match filter function as a function of samples.

FIG. 11 is a diagram illustrating an embodiment 1100 of a match filter function as a function of samples. This embodiment 1100 may assist the reader in identifying the various portions of the match filter function with respect to the functionality 900 of the FIG. 9 that supports match filter detection processing.

When processing the samples of successive symbols (e.g., $S_1$ and $S_2$) within the STS of an OFDM packet as compared to the samples of a predetermined/known symbol, $S_{known}$, the match filter function, $\rho_{MF}^2(n)$, typically rises to peaks and falls to valleys over the samples (e.g., which may be depicted by n) of the successive symbols (e.g., $S_1$ and $S_2$) as a function of the correlation (as determined by the match filter detection processing).

Many of the variables employed with respect to the description of the previous diagram are shown in this diagram, and these are referenced again for the assistance of reader as follows:

$\rho_{MF}^2(n_{P1})$ is the match filter function corresponding to the sample, $n_{P1}$, that corresponds to the $1^{st}$ peak;

$\rho_{MF}^2(n_{P2})$ is the match filter function corresponding to the sample, $n_{P2}$, that corresponds to the $2^{nd}$ peak;

$\rho_{MF}^2(n_{v_1})$ is the match filter function corresponding to the sample, $n_{v_1}$, that corresponds to a particular distance (e.g. in terms of samples) along the match filter function from the $1^{st}$ peak (this sample, $n_{v_1}$, and its distance from the sample, $n_{P1}$, may be predetermined and/or selected by a designer);

$\Delta_{P1-P2}$ is the actual difference between the $1^{st}$ peak and the $2^{nd}$ peak;

$\Delta_{P1+\Delta t P2}$ is the difference between the $1^{st}$ peak and the match filter function at an expected location of a $2^{nd}$ peak; and $\Delta t$ is the time period difference between the $1^{st}$ peak and an expected location of the $2^{nd}$ peak (this may easily be expressed as a function of samples as well).

Also, certain degrees of robustness may be designed into the functionality of any such of the processing that is performed. As one example, when performing match filter function calculation across a plurality of samples, certain criteria may be designed in to allow for a certain amount of failure of correlation while nevertheless providing a match filter detection signal indicating correlation between a received symbol and a predetermined/known symbol. As one embodiment, say N correlations are determined in M collects and corresponding match filter function calculations, then this may be deemed as being sufficient to provide a match filter detection signal indicating correlation between a received symbol and a predetermined/known symbol. However, when less than N correlations are determined in M collects and corresponding match filter function calculations, then this may be deemed as NOT being sufficient to provide a match filter detection signal indicating correlation between a received symbol and a predetermined/known symbol. Certain degrees of robustness, in allowing for a certain degree of imperfectness, in the processing of each of the various calculations and analyses performed herein are certainly within the scope and spirit of the invention.

It is noted that the carrier detect functionality and methods presented herein are applicable to any of a wide variety of communication systems including those particularly depicted and described below. Generally speaking, any signal received from a communication channel may be processing using carrier detect functionality and methods presented herein.

Figure 12:
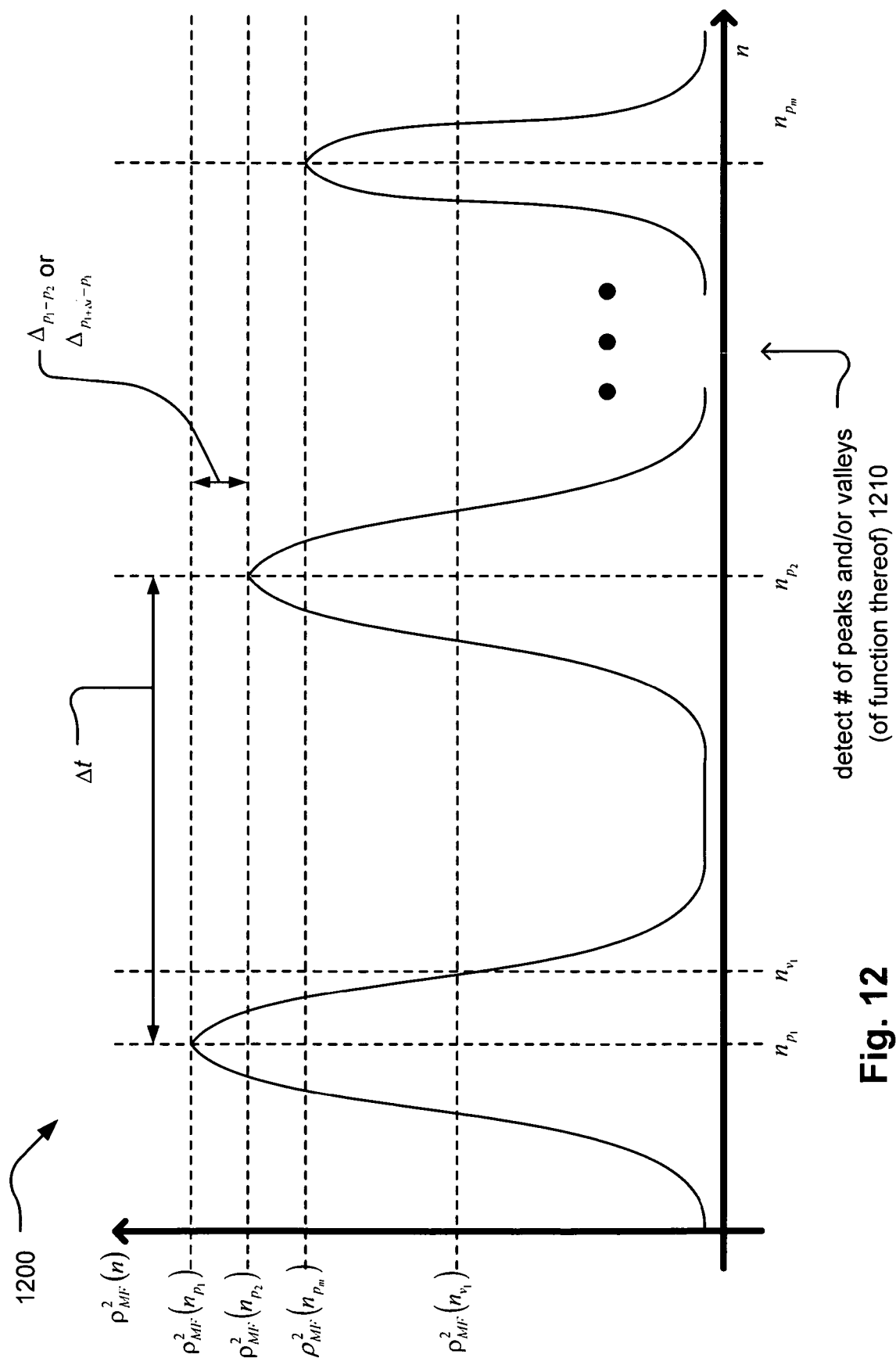
FIG. 12 is a diagram illustrating another embodiment of a match filter function as a function of samples.

FIG. 12 is a diagram illustrating another embodiment 1200 of a match filter function as a function of samples. This embodiment is somewhat analogous to the embodiment 11 of the FIG. 11, with a difference being that the embodiment 1200 depicts m peaks and m-1 valleys of a match filter function as a function of samples.

The embodiment 11 of the FIG. 11 shows two consecutive peaks, and the embodiment 12 of the FIG. 12 generally shows how a match filter function as a function of samples can have m peaks and m-1 valleys. If desired, a designer could select any number of peaks to be detected and processed. Each of these peaks could have its own particular thresholds to meet to satisfy as being a "peak" in the detection process. If desired, analogous parameters (as discussed within the FIG. 11 above) could be employed such as:

(1) $\rho_{MF}^2(n_{Pm})$, the match filter function corresponding to the sample, $n_{Pm}$, that corresponds to the $m^{th}$ peak;

(2) the actual difference between the $1^{st}$ peak ($2^{nd}$ peak, and/or $(m-1)^{th}$ peak) and the $m^{th}$ peak;

(3) the difference between the $1^{st}$ peak ($2^{nd}$ peak, and/or $(m-1)^{th}$ peak) and the match filter function at an expected location of a $m^{th}$ peak; and (4) the time period difference between the $1^{st}$ peak ($2^{nd}$ peak, and/or $(m-1)^{th}$ peak) and an expected location of the $m^{th}$ peak (this may easily be expressed as a function of samples as well).

Other parameters could be employed as well when employing an embodiment that operates using more than merely 2 detected peaks. For example, this could include the detection of the total number of peaks and/or valleys of the match filter function. If desired, some additional function of the peak and/or valley totals could be employed (e.g., a certain number of peaks needs to be identified, a certain number of valleys needs to be identified, etc.).

A designer is provide a wide latitude of how to implement the detection processing using the match filter function. For example, in one instance, if more time is available and/or allowed in a preamble to perform carrier detection, then an absolute peak detection threshold (i.e., the criterion used to affirm an actually detected peak in the match filter function) can be lowered when combined with some other functionality such as requiring 3 or more peaks to be detected besides only 2. For example, the total number of peaks that must be detected can be modified as desired (i.e., requiring 3 or generally, X, versus only 2).

FIG. 13A is a diagram illustrating an embodiment of a single-input-single-output (SISO) communication system 1301. A transmitter (TX 1311) having a single transmit antenna communicates with a receiver (RX 1321) having a single receive antenna.

FIG. 13B is a diagram illustrating an embodiment of a multiple-input-multiple-output (MIMO) communication system 1302. A transmitter (TX 1312) having multiple transmit antennae communicates with a receiver (RX 1322) having multiple receive antennae. Looking only at 2 of the plurality of antennae at either end of the communication channel, a first antenna transmits A and a second antenna transmits B. At the RX 1322, a first antenna receives A'+B' and a second antenna receives A"+B". The RX 1322 includes the appropriate functionality to perform the extraction and generation of a signal that is a best estimate of the transmitted signal A+B.

FIG. 13C is a diagram illustrating an embodiment of a multiple-input-single-output (MISO) communication system 1303. A transmitter (TX 1313) having multiple transmit antennae communicates with a receiver (RX 1323) having a single receive antenna.

FIG. 13D is a diagram illustrating an embodiment of a single-input-multiple-output (SIMO) communication system 1304. A transmitter (TX 1314) having a single transmit antenna communicates with a receiver (RX 1324) having multiple receive antennae. A SIMO communication system may be viewed as being the opposite of a MISO embodiment.

Within communication devices that receive and process multiple signals (e.g., SIMO and MIMO), the carrier detection functionality and methods described herein may be performed for each of the receive paths within such a communication device. These carrier detect signals may then be provided to a combination block that is operable to generate a final carrier detect signal that considers each of the carrier detect signals provided from each of the receive paths. Such a combination block may certainly also receive other inputs that assist in and govern the processing to generate the final carrier detect signal.

In view of the above detailed description of the invention and associated drawings, other modifications and variations will now become apparent. It should also be apparent that such other modifications and variations may be effected without departing from the spirit and scope of the invention.

What is claimed is:

1. An apparatus, comprising:
    an auto-correlation detection module that is operable to:
        calculate a modified correlation function that varies as a function of each sample of a first plurality of samples of a first moving window and each sample of a second plurality of samples of a second moving window of an OFDM (Orthogonal Frequency Division Multiplexing) packet, wherein the modified correlation function is normalized with respect to a first power corresponding to the first moving window and a second power corresponding to the second moving window;
        compare the modified correlation function to a modified correlation function threshold;
        compare the first power corresponding to the first moving window to a first power threshold; and
        compare the second power corresponding to the second moving window to a second power threshold; and
    a match filter detection module that is operable to:
        calculate a match filter function that varies as a function of each sample of the first plurality of samples of the first moving window and each sample of the second plurality of samples of the second moving window of the OFDM packet as compared to a predetermined plurality of samples;
        identify a first peak in the match filter function by comparing the match filter function to a first match filter function threshold;
        identify a second peak in the match filter function by comparing the match filter function to a second match filter function threshold;
        identify a difference in magnitude between the first peak and the second peak;
        identify whether the match filter function falls below a third match filter function threshold between the first peak and the second peak;
        identify a predetermined number of peaks in the match filter function after the first peak and the second peak;
        compare the first power corresponding to the first moving window to a third power threshold; and
        compare the second power corresponding to the second moving window to a fourth power threshold; and
    a combining module that is operable to:
        receive a first output signal from the auto-correlation detection module;
        receive a second output signal from the match filter detection module; and
        process the first output signal and the second output signal to generate a carrier detect signal.

2. The apparatus of claim 1, wherein the apparatus is operable to generate a carrier detect signal indicating carrier detect when:
    the modified correlation function exceeds the modified correlation function threshold;
    the first power corresponding to the first moving window exceeds the first power threshold; and
    the second power corresponding to the second moving window exceeds the second power threshold.

3. The apparatus of claim 1, wherein the match filter detection module also includes at least one additional auto-correlation detection module that is operable to:
    calculate at least one additional modified correlation function that varies as a function of each sample of the first plurality of samples of the first moving window and each sample of the second plurality of samples of the second moving window of the OFDM packet, wherein the at least one additional modified correlation function is normalized with respect to the first power corresponding to the first moving window and the second power corresponding to the second moving window;

compare the at least one additional modified correlation function to at least one additional modified correlation function threshold;

compare the first power corresponding to the first moving window to a fifth power threshold; and compare the second power corresponding to the second moving window to a sixth power threshold.

4. The apparatus of claim 3, wherein the apparatus is operable to generate a carrier detect signal indicating carrier detect when:

the first peak exceeds the first match filter function threshold;

the second peak exceeds the second match filter function threshold;

the difference in magnitude between the first peak and the second peak is less than a difference threshold;

the match filter function falls below the third match filter function threshold between the first peak and the second peak;

the first power corresponding to the first moving window exceeds the third power threshold;

the second power corresponding to the second moving window exceeds the fourth power threshold;

the at least one additional modified correlation function exceeds the at least one additional modified correlation function threshold;

the first power corresponding to the first moving window exceeds the fifth power threshold; and the second power corresponding to the second moving window exceeds the sixth power threshold.

5. The apparatus of claim 3, wherein the apparatus is operable to generate a carrier detect signal indicating carrier detect when:

the modified correlation function exceeds the modified correlation function threshold;

the first power corresponding to the first moving window exceeds the first power threshold;

the second power corresponding to the second moving window exceeds the second power threshold;

the first peak exceeds the first match filter function threshold;

the second peak exceeds the second match filter function threshold;

the difference in magnitude between the first peak and the second peak is less than a difference threshold;

the match filter function falls below the third match filter function threshold between the first peak and the second peak;

the first power corresponding to the first moving window exceeds the third power threshold; and the second power corresponding to the second moving window exceeds the fourth power threshold;

the at least one additional modified correlation function exceeds the at least one additional modified correlation function threshold;

the first power corresponding to the first moving window exceeds the fifth power threshold; and the second power corresponding to the second moving window exceeds the sixth power threshold.

6. The apparatus of claim 1, wherein:

the second power threshold is the first power threshold; and the fourth power threshold is the third power threshold.

7. The apparatus of claim 1, wherein:

the first moving window and the second moving window are situated in a STS (Short Training Sequence) of the OFDM packet that has been extracted from a signal received from a communication channel to which the communication device is communicatively coupled.

8. The apparatus of claim 1, wherein:

the auto-correlation detection module is a first auto-correlation detection module;

the match filter detection module is a first match filter detection module;

the combining module is a first combining module; and the carrier detect signal generated by the first combining module is a first carrier detect signal corresponding to a first received signal stream; and further comprising:

a second auto-correlation detection module;

a second match filter detection module;

a second combining module that is operable to:

receive a third output signal from the second auto-correlation detection module;

receive a fourth output signal from the second match filter detection module; and process the third output signal and the fourth output signal to generate a second carrier detect signal corresponding to a second received signal stream; and a third combining module that is operable to:

receive the first carrier detect signal corresponding to the first received signal stream;

receive the second carrier detect signal corresponding to the second received signal stream;

process the first carrier detect signal corresponding to the first received signal stream and the second carrier detect signal corresponding to the second received signal stream to generate a final carrier detect signal.

9. The apparatus of claim 1, wherein:

the apparatus is operable to generate a carrier detect signal indicating carrier detect when the match filter detection module identifies a predetermined plurality of peaks in the match filter function after identifying the first peak in the match filter function and the second peak in the match filter function.

10. An apparatus, comprising:

a first auto-correlation detection module that is operable to generate a first carrier detect signal corresponding to correlation of a first moving window and a second moving window of an OFDM (Orthogonal Frequency Division Multiplexing) packet as determined using a first plurality of correlation parameters;

a match filter detection module that is operable to generate a match filter detection signal corresponding to match filtering between at least one of the first moving window and the second moving window of the OFDM packet and a predetermined window as determined using a plurality of match filter parameters;

a second auto-correlation detection module that is operable to generate a second carrier detect signal corresponding to correlation of the first moving window and the second moving window of the OFDM packet as determined using a second plurality of correlation parameters; and a combining module that is operable to process the first carrier detect signal, the match filter detection signal, and the second carrier detect signal thereby generating an output carrier detect signal.

11. The apparatus of claim 10, the combining module further comprising:

a first logical AND gate that is operable to receive and process the match filter detection signal and the second carrier detect signal thereby generating an output signal; and a second logical AND gate that is operable to receive and process the output signal and the first carrier detect signal thereby generating the output carrier detect signal.

12. The apparatus of claim 10, the combining module further comprising:
a logical AND gate that is operable to receive and process the match filter detection signal and the second carrier detect signal thereby generating an output signal; and
a logical OR gate that is operable to receive and process the output signal and the first carrier detect signal thereby generating the output carrier detect signal.

13. The apparatus of claim 10, wherein:
the first plurality of correlation parameters includes a modified correlation function threshold, a first power threshold, and a second power threshold;
the first auto-correlation detection module is operable to:
calculate a modified correlation function that varies as a function of each sample of a first plurality of samples of the first moving window and each sample of a second plurality of samples of the second moving window of the OFDM packet, wherein the modified correlation function is normalized with respect to a first power corresponding to the first moving window and a second power corresponding to the second moving window;
compare the modified correlation function to a modified correlation function threshold;
compare the first power corresponding to the first moving window to the first power threshold; and
compare the second power corresponding to the second moving window to the second power threshold;
the plurality of match filter parameters includes a first match filter function threshold, a second match filter function threshold, a third match filter function threshold, a third power threshold, and a fourth power threshold; and
the match filter detection module is operable to:
calculate a match filter function that varies as a function of each sample of the first plurality of samples of the first moving window and each sample of the second plurality of samples of the second moving window of the OFDM packet and as compared to a predetermined plurality of samples;
identify a first peak in the match filter function by comparing the match filter function to the first match filter function threshold;
identify a second peak in the match filter function by comparing the match filter function to the second match filter function threshold;
identify a difference in magnitude between the first peak and the second peak;
identify whether the match filter function falls below the third match filter function threshold between the first peak and the second peak;
identify a predetermined number of peaks in the match filter function after the first peak and the second peak;
compare the first power corresponding to the first moving window to the third power threshold; and
compare the second power corresponding to the second moving window to the fourth power threshold.

14. The apparatus of claim 13, wherein:
the second plurality of correlation parameters includes at least one additional modified correlation function threshold, a fifth power threshold, and a sixth power threshold;
the second auto-correlation detection module is operable to:
calculate at least one additional modified correlation function that varies as a function of each sample of the first plurality of samples of the first moving window and each sample of the second plurality of samples of the second moving window of the OFDM packet, wherein the at least one additional modified correlation function is normalized with respect to the first power corresponding to the first moving window and the second power corresponding to the second moving window;
compare the at least one additional modified correlation function to at least one additional modified correlation function threshold;
compare the first power corresponding to the first moving window to the fifth power threshold; and
compare the second power corresponding to the second moving window to the sixth power threshold.

15. The apparatus of claim 13, wherein the apparatus is operable to generate an output carrier detect signal indicating carrier detect when:
the first peak exceeds the first match filter function threshold;
the second peak exceeds the second match filter function threshold;
the difference in magnitude between the first peak and the second peak is less than a difference threshold;
the match filter function falls below the third match filter function threshold between the first peak and the second peak;
the first power corresponding to the first moving window exceeds the third power threshold;
the second power corresponding to the second moving window exceeds the fourth power threshold;
the at least one additional modified correlation function exceeds the at least one additional modified correlation function threshold;
the first power corresponding to the first moving window exceeds the fifth power threshold; and
the second power corresponding to the second moving window exceeds the sixth power threshold.

16. The apparatus of claim 13, wherein the apparatus is operable to generate an output carrier detect signal indicating carrier detect when:
the modified correlation function exceeds the modified correlation function threshold;
the first power corresponding to the first moving window exceeds the first power threshold;
the second power corresponding to the second moving window exceeds the second power threshold;
the first peak exceeds the first match filter function threshold;
the second peak exceeds the second match filter function threshold;
the difference in magnitude between the first peak and the second peak is less than a difference threshold;
the match filter function falls below the third match filter function threshold between the first peak and the second peak;
the first power corresponding to the first moving window exceeds the third power threshold;
the second power corresponding to the second moving window exceeds the fourth power threshold;
the at least one additional modified correlation function exceeds the at least one additional modified correlation function threshold;
the first power corresponding to the first moving window exceeds the fifth power threshold; and the second power corresponding to the second moving window exceeds the sixth power threshold.

17. The apparatus of claim 13, wherein the apparatus is operable to generate an output carrier detect signal indicating carrier detect when:
the modified correlation function exceeds the modified correlation function threshold;
the first power corresponding to the first moving window exceeds the first power threshold; and
the second power corresponding to the second moving window exceeds the second power threshold.

18. The apparatus of claim 10, wherein:
the first moving window and the second moving window are situated in a STS (Short Training Sequence) of the OFDM packet that has been extracted from a signal received from a communication channel to which the communication device is communicatively coupled.

19. The apparatus of claim 10, wherein:
the match filter detection module is a first match filter detection module;
the match filter detection signal is a first match filter detection signal;
the combining module is a first combining module;
the output carrier detect signal is a first output carrier detect signal that corresponds to a first received signal stream; and further comprising:
a third auto-correlation detection module that is operable to generate a third carrier detect signal;
a second match filter detection module that is operable to generate a second match filter detection signal;
a fourth auto-correlation detection module that is operable to generate a fourth carrier detect signal; and
a second combining module that is operable to process the third carrier detect signal, the second match filter detection signal, and the fourth carrier detect signal thereby generating a second output carrier detect signal that corresponds to a second received signal stream; and
a third combining module that is operable to:
receive the first output carrier detect signal corresponding to the first received signal stream;
receive the second output carrier detect signal corresponding to the second received signal stream;
process the first output carrier detect signal corresponding to the first received signal stream and the second output carrier detect signal corresponding to the second received signal stream to generate a final carrier detect signal.

20. The apparatus of claim 10, wherein:
the apparatus is operable to generate a carrier detect signal indicating carrier detect when the match filter detection module identifies a predetermined plurality of peaks in the match filter function after identifying the first peak in the match filter function and the second peak in the match filter function.

21. A method, comprising:
calculating a modified correlation function that varies as a function of each sample of a first plurality of samples of a first moving window and each sample of a second plurality of samples of a second moving window of an OFDM (Orthogonal Frequency Division Multiplexing) packet, wherein the modified correlation function is normalized with respect to a first power corresponding to the first moving window and a second power corresponding to the second moving window;
performing a first comparison that includes comparing the modified correlation function to a modified correlation function threshold;
performing a second comparison that includes comparing the first power corresponding to the first moving window to a first power threshold; and
employing a combining module to process results from the first comparison, the second comparison, and the third comparison thereby generating a carrier detect signal corresponding to a received signal stream.

22. The method of claim 21, wherein the carrier detect signal indicates carrier detect when:
the modified correlation function exceeds the modified correlation function threshold;
the first power corresponding to the first moving window exceeds the first power threshold; and
the second power corresponding to the second moving window exceeds the second power threshold.

23. The method of claim 21, further comprising:
calculating a match filter function that varies as a function of each sample of the first plurality of samples of the first moving window and each sample of the second plurality of samples of the second moving window of the OFDM packet and as compared to a predetermined plurality of samples;
identifying a first peak in the match filter function by comparing the match filter function to a first match filter function threshold;
identifying a second peak in the match filter function by comparing the match filter function to a second match filter function threshold;
identifying a difference in magnitude between the first peak and the second peak;
identifying whether the match filter function falls below a third match filter function threshold between the first peak and the second peak;
identifying a predetermined number of peaks in the match filter function after the first peak and the second peak;
comparing the first power corresponding to the first moving window to a third power threshold; and
comparing the second power corresponding to the second moving window to a fourth power threshold.

24. The method of claim 21, further comprising:
calculating at least one additional modified correlation function that varies as a function of each sample of the first plurality of samples of the first moving window and each sample of the second plurality of samples of the second moving window of the OFDM packet, wherein the at least one additional modified correlation function is normalized with respect to the first power corresponding to the first moving window and the second power corresponding to the second moving window;
comparing the at least one additional modified correlation function to the at least one additional modified correlation function threshold;
comparing the power of the first moving window to a fifth power threshold;
comparing the power of the second moving window to a sixth power threshold; and
generating a carrier detect signal indicating carrier detect when:
the first peak exceeds the first match filter function threshold;
the second peak exceeds the second match filter function threshold;
the difference in magnitude between the first peak and the second peak is less than a difference threshold;
the match filter function falls below the third match filter function threshold between the first peak and the second peak;

the first power corresponding to the first moving window exceeds the third power threshold;

the second power corresponding to the second moving window exceeds the fourth power threshold;

the at least one additional modified correlation function exceeds the at least one additional modified correlation function threshold;

the first power corresponding to the first moving window exceeds the fifth power threshold; and the second power corresponding to the second moving window exceeds the sixth power threshold.

25. The method of claim 21, wherein:

the carrier detect signal corresponding to the received signal received signal stream is a first carrier detect signal corresponding to a first received signal stream;

generating a second carrier detect corresponding to a second received signal stream; and combining the first carrier detect signal corresponding to the first received signal stream and the second carrier detect signal corresponding to the second received signal stream thereby generating a final carrier detect signal.

26. The method of claim 21, further comprising:

calculating a match filter function that varies as a function of each sample of the first plurality of samples of the first moving window and each sample of the second plurality of samples of the second moving window of the OFDM packet and as compared to a predetermined plurality of samples;

identifying a first peak in the match filter function by comparing the match filter function to a first match filter function threshold;

identifying a second peak in the match filter function by comparing the match filter function to a second match filter function threshold; and generating a carrier detect signal indicating carrier detect when identifying a predetermined plurality of peaks in the match filter function after identifying the first peak in the match filter function and the second peak in the match filter function.

* * * * *

UNITED STATES PATENT AND TRADEMARK OFFICE
CERTIFICATE OF CORRECTION

PATENT NO. : 7,583,758 B2 Page 1 of 1
APPLICATION NO. : 11/402571
DATED : September 1, 2009
INVENTOR(S) : Rohit V. Gaikwad, Rajendra Tushar Moorti and Jason A. Trachewsky It is certified that error appears in the above-identified patent and that said Letters Patent is hereby corrected as shown below:

Column 28, line 4, in Claim 21: insert:
--performing a third comparison that includes comparing the second power corresponding to the second moving window to a second power threshold; and--.

Signed and Sealed this

Twenty-fourth Day of November, 2009

David J. Kappos
*Director of the United States Patent and Trademark Office*